(12) United States Patent
Klein et al.

(10) Patent No.: US 10,132,525 B2
(45) Date of Patent: *Nov. 20, 2018

(54) HIGH THERMAL TRANSFER FLOW-THROUGH HEAT EXCHANGER

(71) Applicant: Peter Klein, Langley (CA)

(72) Inventors: Peter Klein, Langley (CA); Colin Michael Scotter, Langley (CA)

(73) Assignee: Peter Klein, Langley, British Columbia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/359,163

(22) Filed: Nov. 22, 2016

(65) Prior Publication Data

US 2017/0074545 A1    Mar. 16, 2017

Related U.S. Application Data

(63) Continuation-in-part of application No. 13/839,522, filed on Mar. 15, 2013, now Pat. No. 9,516,971.

(51) Int. Cl.
  *F24H 1/10* (2006.01)
  *A47J 31/00* (2006.01)
  (Continued)

(52) U.S. Cl.
  CPC ............ *F24H 1/102* (2013.01); *A47J 31/542* (2013.01); *F24H 1/0018* (2013.01); *F24H 1/162* (2013.01);
  (Continued)

(58) Field of Classification Search
  None
  See application file for complete search history.

(56) References Cited

U.S. PATENT DOCUMENTS

| 941,215 A | 11/1909 | Wade |
| 2,775,683 A | 12/1956 | Kleist |

(Continued)

FOREIGN PATENT DOCUMENTS

| WO | 2004006742 | 1/2004 |
| WO | 2007014811 | 2/2007 |

(Continued)

*Primary Examiner* — Thor Campbell
(74) *Attorney, Agent, or Firm* — Todd A. Rattray, Oyen Wiggs Green & Mutala LLP

(57) ABSTRACT

A flow-through fluid heater comprises: a high thermal conductivity conduit-defining body shaped to provide a conduit that extends between an inlet port and an outlet port; one or more heating elements connected to the body for providing heat to the body, thereby permitting the body to provide heat to fluid flowing through the conduit; a temperature sensor connected to sense a measured temperature indicative of a temperature of the fluid in a vicinity of the temperature sensor; one or more flow rate sensors for sensing a measured flow rate of the fluid through the conduit; and a controller connected to receive signals from the temperature sensor and the flow rate sensors, the controller configured to control an amount of heat energy imparted to the fluid during a period that the fluid is resident in the conduit between the inlet port and the outlet port based at least in part on the measured temperature and the measured flow rate.

25 Claims, 12 Drawing Sheets

(51) Int. Cl.
  *H05B 1/02*  (2006.01)
  *F24H 1/00*  (2006.01)
  *A47J 31/54* (2006.01)
  *F24H 1/16*  (2006.01)

(52) U.S. Cl.
  CPC ....... *H05B 1/0244* (2013.01); *F24H 2250/02* (2013.01); *H05B 2203/021* (2013.01); *Y10T 137/0318* (2015.04); *Y10T 137/6606* (2015.04)

(56) References Cited

U.S. PATENT DOCUMENTS

| | | | |
|---|---|---|---|
| 3,782,456 A | | 1/1974 | Gusmer |
| 3,854,032 A | | 12/1974 | Cooper |
| 4,199,675 A | | 4/1980 | Sharpless |
| 4,334,141 A | | 6/1982 | Roller |
| 4,343,988 A | | 8/1982 | Roller |
| 4,458,642 A | | 7/1984 | Okubo |
| 4,465,922 A | | 8/1984 | Kolibas |
| 4,480,172 A | | 10/1984 | Ciciliot |
| 4,638,147 A | * | 1/1987 | Dytch ................ G05D 23/1912 219/484 |
| 5,027,425 A | | 6/1991 | Slomka |
| 5,111,740 A | | 5/1992 | Klein |
| 5,226,596 A | | 7/1993 | Okamura |
| 5,249,623 A | | 10/1993 | Muller |
| 5,265,318 A | | 11/1993 | Shero |
| 5,271,086 A | * | 12/1993 | Kamiyama ............. F24H 1/142 137/341 |
| 5,438,642 A | * | 8/1995 | Posen .................... F24H 1/102 122/19.1 |
| 5,557,704 A | | 9/1996 | Dennis |
| 5,724,478 A | | 3/1998 | Thweatt |
| 6,330,395 B1 | | 12/2001 | Wu |
| 6,343,416 B1 | | 2/2002 | Miller |
| 6,442,341 B1 | | 8/2002 | Wu |
| 6,782,195 B2 | | 8/2004 | Abras |
| 6,816,670 B1 | | 11/2004 | Renau |
| 7,286,752 B2 | | 10/2007 | Gourand |
| 7,760,993 B2 | | 7/2010 | You |
| 7,813,628 B2 | | 10/2010 | Haan |
| 7,822,326 B2 | | 10/2010 | Commette |
| 7,899,309 B2 | | 3/2011 | Whyatt |
| 8,107,803 B1 | | 1/2012 | Hannah et al. |
| 8,150,245 B2 | * | 4/2012 | Stimpson ................ E03C 1/041 392/465 |
| 8,165,461 B2 | | 4/2012 | Sullivan |
| 8,170,406 B2 | | 5/2012 | Wu |
| 8,180,207 B2 | | 5/2012 | Shirai |
| 8,358,922 B2 | | 1/2013 | Stickel |
| 8,731,386 B2 | | 5/2014 | Waechter |
| 2010/0046934 A1 | | 2/2010 | Johnson et al. |

FOREIGN PATENT DOCUMENTS

| | | |
|---|---|---|
| WO | 2008099322 | 8/2008 |
| WO | 2010090898 | 8/2010 |
| WO | 2010133409 | 11/2010 |
| WO | 2012089653 | 7/2012 |

* cited by examiner $f = 0.8$mm
$g = 3.2$mm
$h = 2.4$mm $f = 1.6$mm
$g = 1.6$mm
$h = 1.6$mm $f = 3.2$mm
$g = 0.8$mm
$h = 0.2$mm

HIGH THERMAL TRANSFER FLOW-THROUGH HEAT EXCHANGER

REFERENCE TO RELATED APPLICATIONS

This application is a continuation-in-part of U.S. application Ser. No. 13/839,522 having a filing date of 15 Mar. 2013 which is hereby incorporated herein by reference.

TECHNICAL FIELD

This technology relates to compact tankless or flow-through heaters. Particular embodiments provide flow through heaters and methods for fabrication and use of same.

BACKGROUND

Tankless or flow-through heaters are known and are used to heat fluids (i.e. liquids and/or gases) while these media are being transferred to their point of use. Examples, where such flow-through heaters are typically used, are beverage brewing machines, such as household coffee makers, automotive windshield washer fluid heaters, hot water heaters for use in households and on board of aircraft, and in laboratory equipment.

Typical prior art flow-through heaters used in beverage brewing apparatus incorporate a heating element and a conduit-defining body which defines a conduit through which the media flows. Heat is transferred from the heating element, through the conduit-defining body, to the medium flowing through the conduit. In these prior art flow-through heaters, the local rate of heat transfer and the temperature distribution in the heaters are governed by the physical laws of heat conduction inside the conduit-defining body and heat convection where heat is transferred from the conduit-defining body to and through the fluid in the conduit. Typically, radiation heat-transfer mechanisms play a negligible role.

Prior art flow through heaters used in beverage brewing apparatus can generally be broken down into two design approaches. A first approach where the heating element is surrounded by the medium and the medium is contained by the conduit-defining body, and a second approach where the heating element is outside of the conduit-defining body and transfers its heat through the conduit-defining body to the medium flowing in the conduit itself.

In the first approach, where the heating element is immersed in the medium and is located inside the conduit-defining body, all heat generated is practically transferred to the medium, but a reliable seal is required where the heating element penetrates the conduit-defining body and into the medium. Providing a functional seal under thermal cycling conditions can pose reliability and cost challenges. Conversely, in the second approach, where the heating element is located outside of the conduit-defining body, not all heat can be transferred to the medium as there are losses to the environment away from the medium. However, the second approach preserves the integrity of the conduit, as all heating elements and their connections remain outside of the conduit, and a leak-proof design can be achieved with relative ease at relatively low cost.

Most known flow-through heaters used in beverage brewing apparatus seek to boil water. Boiling water causes undesirable scaling of the conduit-defining walls. Known prior art flow through heaters used for beverage brewing include those described, for example, in: U.S. Pat. Nos. 5,027,425; 5,111,740; and 8,107,803; and US patent publication No. 2010/046934.

Apart from the desire of heating fluid in a short period of time, there are a number of general desires in the field of flow-through heaters used in beverage brewing. These general desires include:

- the desire to minimize the size of the heater or to otherwise make the heater more compact, permitting the heater to function under significant space constraints;
- the desire to heat the medium to a desired (controllable) temperature, in a minimum possible time and with a minimum use of power; and
- minimizing scaling on the conduit walls, since scaling lowers thermal conductivity, causing the temperature of the heating element to rise (due to the diminished heat transfer rate) and reduces the life expectancy of the heater.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a flow-through heater for heating a fluid, the flow-through heater comprising: a high thermal conductivity conduit-defining body shaped to provide, within the conduit-defining body, a helical-shaped or spiral-shaped conduit that extends between an inlet port and an outlet port; and one or more heating elements operatively connected to an exterior of the conduit-defining body for providing heat to the conduit-defining body and to any fluid flowing through the conduit. Because of the high thermal conductivity of the conduit-defining body, all of the surfaces of the conduit-defining body that actually define the conduit may contribute significantly to heating the fluid in the conduit. In some embodiments, for at least 80% of the length of the conduit (e.g. in a central section of the conduit excluding conduit sections adjacent to the inlet and outlet ports), each conduit-defining surface may contribute to heating the fluid in approximately equal proportion to its conduit-defining surface area. In some such embodiments, for a central section of the conduit comprising at least 80% of the length of the conduit, the variation in heat flux over the conduit defining surfaces may be less than 20%. In some such embodiments, this heat flux variation is less than 10%. In some embodiments, the fluid is liquid. In some embodiments, the liquid is water. In some embodiments, the flow-through heater is used as part of a beverage brewing apparatus.

In one particular embodiment, the conduit-defining body is shaped to provide a helical-shaped conduit and the conduit-defining body comprises: an outer sleeve comprising a longitudinally extending bore therethrough; and an insert member comprising a longitudinally extending core and a helical-shaped wall which extends outwardly from an outer surface of the core, wherein the insert member is received in the bore to provide a heat-conducting abutment contact between an outer surface of the helical-shaped wall and a bore-defining surface of the outer sleeve. Together, the outer surface of the core, side surfaces of the helical-shaped wall and the bore-defining surface of the outer sleeve define over 80% of the length of the conduit between the inlet port and the outlet port (e.g. a central section of the conduit potentially excluding a lead in section near the inlet port and a lead out section near the outlet port). The abutting contact between the outer surface of the helical-shaped wall of the insert member and the bore-defining surface of the outer sleeve may be a highly heat conductive contact. Such a heat-conducting contact may be achieved by press-fitting (or crimping) the insert member into the bore of the outer sleeve, which may involve some deformation of one or both of the insert member and the outer sleeve. In some embodiments, a gap-filling, heat-conducting joint material may be used between contact surfaces of the insert member and the outer sleeve.

In another particular embodiment, the conduit-defining body is shaped to provide a helical-shaped conduit and the conduit-defining body comprises: an outer sleeve comprising a longitudinally extending bore therethrough and a helical shaped wall that extends inwardly from an inward facing surface of the bore; and an insert member which is received in the bore to provide a heat-conducting abutment contact between an outer surface of the insert member and an inward-facing surface of the helical-shaped wall. Together, the outer surface of the insert member, side surfaces of the helical-shaped wall and an inward-facing surface of the outer sleeve define over 80% of the length of the conduit between the inlet port and the outlet port (e.g. a central section of the conduit potentially excluding a lead in section near the inlet port and a lead out section near the outlet port). The abutting contact between the outer surface of the insert member and the inward-facing surface of the helical-shaped wall may be a highly heat conductive contact. Such a heat-conducting contact may be achieved by press-fitting (or crimping) the insert member into the bore of the outer sleeve, which may involve some deformation of one or both of the insert member and the outer sleeve. In some embodiments, a gap-filling, heat-conducting joint material may be used between contact surfaces of the insert member and the outer sleeve.

In one particular embodiment, the conduit-defining body is shaped to provide a plurality of parallel sub-conduits and the conduit-defining body comprises: an outer sleeve comprising a longitudinally extending bore therethrough; and an insert member comprising a longitudinally extending core and a plurality of splines that extend longitudinally and outwardly away from an outer surface of the core, wherein the insert member is received in the bore to provide a heat-conducting abutment contact between outer surfaces of the splines and a bore-defining surface of the outer sleeve. Together, the outer surface of the core, side surfaces of the splines and the bore-defining surface of the outer sleeve define over 80% of the length of the sub-conduits between the inlet port and the outlet port (e.g. a central section of the conduit potentially excluding a lead in section near the inlet port and a lead out section near the outlet port). The abutting contact between the outer surfaces of the splines of the insert member and the bore-defining surface of the outer sleeve may be a highly heat conductive contact which may be achieved by press-fitting (or crimping) the insert member into the bore of the outer sleeve, which may involve some deformation of one or both of the insert member and the outer sleeve. In some embodiments, a gap-filling, heat-conducting joint material may be used between contact surfaces of the insert member and the outer sleeve.

In one particular embodiment, the conduit-defining body is shaped to provide a plurality of parallel sub-conduits and the conduit-defining body comprises: an outer sleeve comprising a longitudinally extending bore therethrough and a plurality of splines that extend longitudinally and inwardly from an inward facing surface of the bore; and an insert member which is received in the bore to provide a heat-conducting abutment contact between an outer surface of the insert member and inward-facing surfaces of the plurality of splines. Together, the outer surface of the insert member, side surfaces of the splines and an inward-facing surface of the outer sleeve define over 80% of the length of the conduit between the inlet port and the outlet port (e.g. a central section of the conduit potentially excluding a lead in section near the inlet port and a lead out section near the outlet port). The abutting contact between the inward facing surfaces of the splines of the outer sleeve and the outer surface of the insert member may be a highly heat conductive contact which may be achieved by press-fitting (or crimping) the insert member into the bore of the outer sleeve, which may involve some deformation of one or both of the insert member and the outer sleeve. In some embodiments, a gap-filling, heat-conducting joint material may be used between contact surfaces of the insert member and the outer sleeve.

Both the outer sleeve and the insert member may be fabricated from high thermal conductivity materials (e.g. copper, silver, nickel-plated aluminum, carbon nanotubes and/or the like). In some embodiments, these high thermal conductivity materials may have thermal conductivities greater than 100 W/mK). In some embodiments, these high thermal conductivity materials have thermal conductivities that are greater than 200 times the thermal conductivity of the fluid for which they are designed. In some embodiments, both the outer sleeve and the insert member may be fabricated from the same high thermal conductivity material.

In one particular embodiment, the conduit-defining body is shaped to provide a spiral-shaped conduit and the conduit-defining body comprises: an upper member having a downwardly facing upper base surface; a lower member comprising an upwardly facing lower base surface; and a spiral-shaped wall which extends between the upper and lower base surfaces. In some embodiments, the spiral-shaped wall is integrally formed with the upper member and abuts against the lower base surface to provide a heat-conductive contact therebetween; in some embodiments, the spiral-shaped wall is integrally formed with the lower member and abuts against the upper base surface to provide a heat-conductive contact therebetween; and, in some embodiments, the spiral-shaped wall is formed separately from the upper and lower members and abuts against both the upper and lower base surfaces to provide heat-conductive contacts therebetween.

The upper member, lower member and spiral-shaped wall may be fabricated from high thermal conductivity materials (e.g. copper, silver, nickel-plated aluminum, carbon nanotubes and/or the like). In some embodiments, these high thermal conductivity materials may have thermal conductivities greater than 100 W/mK). In some embodiments, these high thermal conductivity materials have thermal conductivities that are greater than 200 times the thermal conductivity of the fluid for which they are designed. In some embodiments, the upper member, lower member and spiral-shaped wall may be fabricated from the same high thermal conductivity material. Together, the upper base surface, the lower base surface and the side surfaces of the spiral-shaped wall define over 80% of the length of the conduit between the inlet port and the outlet port (e.g. a central section of the conduit potentially excluding a lead in section near the inlet port and a lead out section near the outlet port). The abutting contact between the spiral-shaped wall and the at least one of the upper and lower base surfaces may be a highly heat conductive contact. Such a heat-conducting contact may be achieved by press-fitting the spiral-shaped wall between the upper member and lower member, which may involve some deformation of one or more of: the spiral-shaped wall, the upper member and the lower member. In some embodiments, a gap-filling, heat-conducting joint material may be used between contact surfaces of the spiral-shaped wall and the at least one of the upper and lower base surfaces.

The temperature to which the liquid in the conduit is to be heated, the material of the conduit-defining body and a contact area between the conduit-defining body and the liquid in the conduit may be selected such that the contact area is high enough so that the watt density is below that which is known to promote nucleate boiling for the combination of the material of the conduit-defining body and the fluid flowing in the conduit. In some embodiments, the amount of surface area of the conduit-defining surfaces may be designed to avoid nucleate boiling of the fluid as it travels through the conduit. For example, for a known maximum power, a known fluid pressure and a known fluid/conduit-defining body material combination for which a maximum watt density is known to exist above which nucleate boiling occurs, the amount of surface area of the conduit-defining surfaces may be chosen to be greater than the maximum power divided by the known watt density.

The material of the conduit-defining body may be selected to have high thermal conductivity (e.g. thermal conductivity greater than 100 W/mK and/or greater than 200 times the thermal conductivity of the fluid for which they are designed). Such high thermal conductivity may help provide relatively even temperature on walls which define the conduit within the conduit-defining body. The volume of the conduit-defining body between adjacent loops of the helical-shaped or spiral-shaped conduit may be selected to be sufficient (in combination with the high-thermal conductivity used for the material of the conduit-defining body) to minimize local temperature gradients on walls which define the conduit within the conduit-defining body. Such selection of the volume of the conduit-defining body between adjacent loops of the helical-shaped or spiral-shaped conduit may also help to provide relatively even temperature on, and/or heat flux through, the walls which define the conduit within the conduit-defining body.

In some embodiments, the conduit defining surface(s) are shaped such that the cross-sectional shape of the conduit is generally rectangular with a ratio of the dimensions of its sides being in a range of 0.3-3. In some embodiments, this ratio is in a range of 0.8-1.2. In some embodiments, the helical-shaped wall of the insert member is shaped such that a ratio of the longitudinal dimension of the cross-section of the helical-shaped wall to the longitudinal dimension of the cross-section of the conduit is in a range of 0.3-3. In some embodiments, this ratio is in a range of 0.8-1.2. In some embodiments, the helical-shaped wall of the insert member is shaped such that the inward/outward dimension of the cross-section of the conduit, the longitudinal dimension of the cross-section of the conduit and the longitudinal dimension of the cross-section of the helical-shaped wall are within 20% of one another.

In some embodiments, the spiral-shaped wall is shaped such that a ratio of the radial dimension of the cross-section of the spiral-shaped wall to the radial dimension of the cross-section of the conduit is in a range of 0.3-3. In some embodiments, this ratio is in a range of 0.8-1.2. In some embodiments, the spiral-shaped wall is shaped such that the upward/downward dimension of the cross-section of the conduit, the radial dimension of the cross-section of the conduit and the radial dimension of the cross-section of the spiral-shaped wall are within 20% of one another.

The conduit-defining body may be shaped to provide a conduit that is spiral-shaped or helical-shaped to promote turbulence by providing different path lengths for fluid molecules traveling along a conduit-defining surface of relatively large radius compared to those traveling along a conduit-defining surface of relatively short radius. This creates a velocity difference, and a corresponding shear force between the faster and slower traveling molecules and corresponding turbulence in the conduit.

In some embodiments, the thermal time constant of the conduit-defining body $R_{th}C_{th(body)}$ is selected to be equal to the thermal time constant of the fluid $R_{th}C_{th(fluid)}$ being heated in the conduit or for which the flow-through heater is intended to be used. In some embodiments, the thermal time constant of the conduit-defining body $R_{th}C_{th(body)}$ is selected to be equal to the thermal time constant of water. In some embodiments, these equalities may be approximate equalities (e.g. +/−10%). This selection of thermal time constants may help to facilitate desirable temperature control.

Another aspect of the invention provides a method for heating a fluid in a flow-through heater. The method comprises: providing a high thermal conductivity conduit-defining body shaped to provide, within the conduit-defining body, a helical-shaped or spiral-shaped conduit that extends between an inlet port and an outlet port; heating the conduit-defining body to provide heat to any fluid flowing through the conduit; and shaping the conduit-defining body such that the conduit comprises a central section comprising over 80% of the length of the conduit at locations away from the inlet port and outlet port and such that for any given cross-section of the conduit in the central section, heat flows evenly from the conduit-defining body into the conduit with a heat flux variation of less than 20% over an entire perimeter of the cross-section.

One aspect of the invention provides a method for heating a fluid in a flow-through heater. The method comprises: providing a high thermal conductivity conduit-defining body shaped to provide, within the conduit-defining body, a conduit that extends between an inlet port and an outlet port; heating the conduit-defining body to thereby provide heat to any fluid flowing through the conduit; and shaping the conduit-defining body such that the conduit comprises a central section comprising over 80% of the length of the conduit at locations away from the inlet port and outlet port and such that for any given cross-section of the conduit in the central section, heat flows evenly from the conduit-defining body into the conduit with a heat flux variation of less than 20% over a perimeter of the cross-section. Methods may be provided which incorporate any features, combinations of features and/or sub-combinations of features of any of the apparatus described herein.

One aspect of the invention provides a flow-through heater for heating a fluid. The flow-through heater comprises: a high thermal conductivity conduit-defining body shaped to provide, within the conduit-defining body, a conduit that extends between an inlet port and an outlet port; one or more heating elements connected to the conduit-defining body by corresponding heat-conducting connections for providing heat to the conduit-defining body, thereby permitting the conduit defining-body to provide heat to fluid flowing through the conduit; a temperature sensor connected to sense a measured temperature indicative of a temperature of the fluid in a vicinity of the temperature sensor; one or more flow rate sensors for sensing a measured flow rate of the fluid through the conduit; and a controller connected to receive a temperature sensor signal generated by the temperature sensor and a flow rate signal generated by the one or more flow rate sensors, the controller configured to control an amount of heat energy imparted to the fluid during a period that the fluid is resident in the conduit between the inlet port and the outlet port based at least in part on the measured temperature and the measured flow rate.

One aspect of the invention provides a method for heating a fluid in a flow-through heater. The method comprises: providing a high thermal conductivity conduit-defining body shaped to provide, within the conduit-defining body, a conduit that extends between an inlet port and an outlet port; heating the conduit-defining body using one or more heating elements to thereby provide heat to any fluid flowing through the conduit; sensing a measured temperature indicative of a temperature of the fluid; sensing a measured flow rate of the fluid through the conduit; and controlling, by a controller, an amount of heat energy imparted to the fluid during a period that the fluid is resident in the conduit between the inlet port and the outlet port based at least in part on the measured temperature and the measured flow rate.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a flow-through heater for heating a fluid, the flow-through heater comprising: a high thermal conductivity conduit-defining body shaped to provide, within the conduit-defining body, a helical-shaped or spiral-shaped conduit that extends between an inlet port and an outlet port; and one or more heating elements operatively connected to an exterior of the conduit-defining body for providing heat to the conduit-defining body and to any fluid flowing through the conduit. Because of the high thermal conductivity of the conduit-defining body, all of the surfaces of the conduit-defining body that actually define the conduit may contribute significantly to heating the fluid in the conduit. In some embodiments, for at least 80% of the length of the conduit (e.g. a central section of the conduit potentially excluding conduit sections adjacent to the inlet and outlet ports), each conduit-defining surface may contribute to heating the fluid in approximately equal proportion to its conduit-defining surface area. In some such embodiments, for at least 80% of the length of the conduit, the variation in heat flux over the conduit defining surfaces may be less than 20%. In some such embodiments, this heat flux variation is less than 10%. In some embodiments, the fluid is liquid. In some embodiments, the liquid is water. In some embodiments, the flow-through heater is used as part of a beverage brewing apparatus.

FIGS. 1-3B provide various views of a flow-through heater 10 according to a particular embodiment. Heater 10 may be used to heat fluids—i.e. liquids and gases. In some embodiments, heater 10 may be used to heat water in beverage brewing apparatus (not shown). In some embodiments, heater 10 can be used to heat other fluids and/or for other purposes.

Figure 3A:
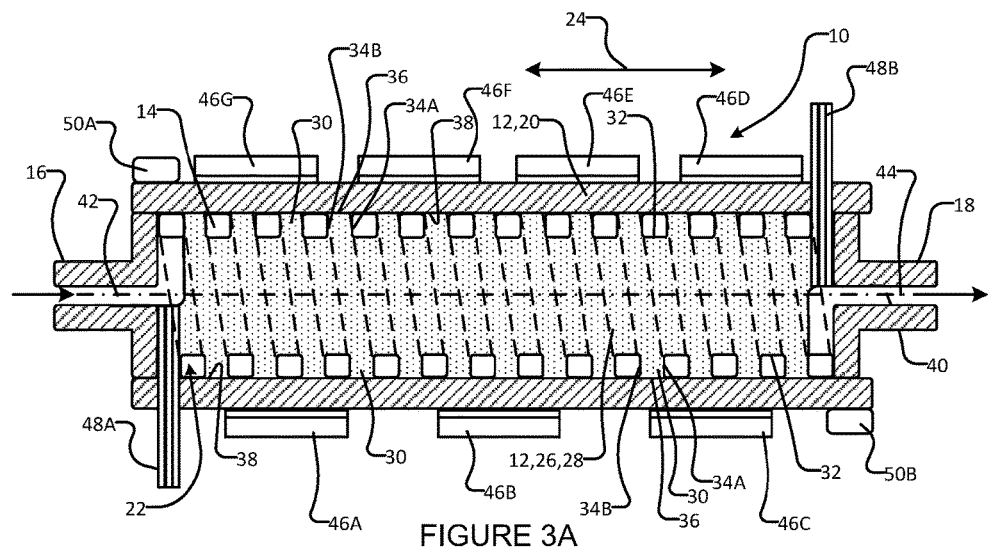
FIG. 3A is a schematic cross-sectional view of the FIG. 1 heater taken along the line 3A-3A shown in FIG. 1.
Figure 3B:
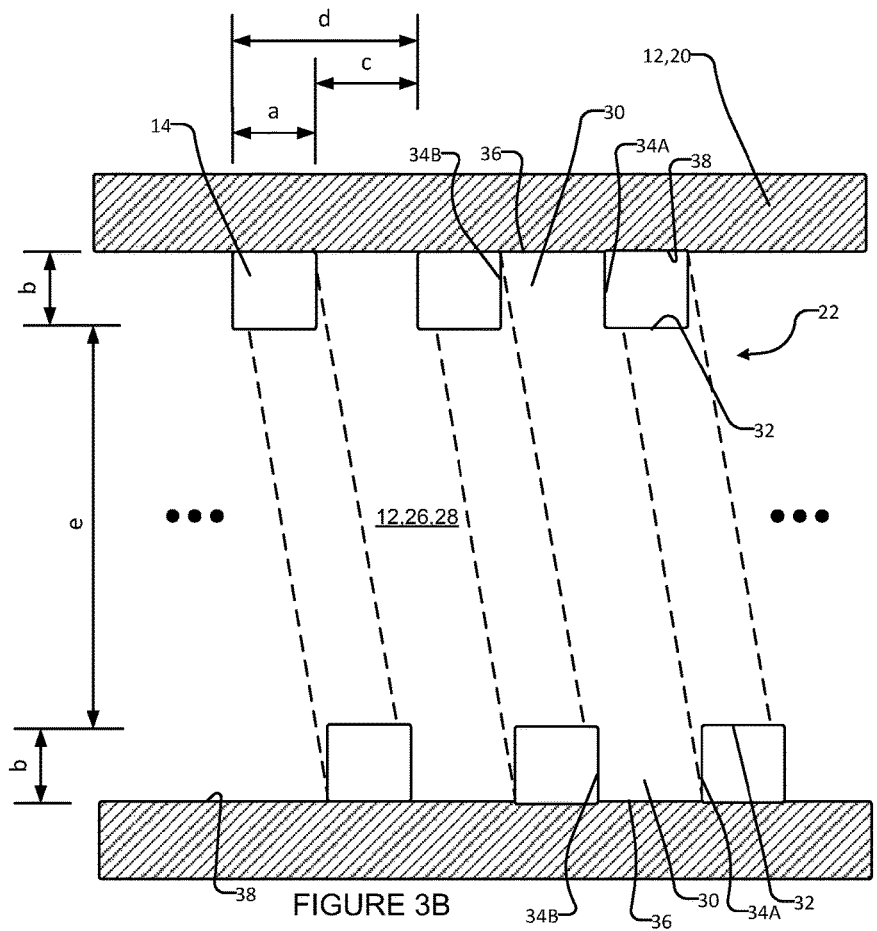
FIG. 3B is a magnified view of a portion of the FIG. 3A schematic cross-section.

Heater 10 comprises a conduit-defining body 12 which defines a conduit 14 (see FIGS. 3A and 3B (collectively, FIG. 3)) that extends between an inlet port 16 (through which fluid enters heater 10) and an outlet port 18 (through which fluid egresses from heater 10). In the illustrated embodiment, conduit defining body 12 comprises: an outer sleeve 20 comprising a bore defining surface 38 shaped to define a bore 22 which extends in a longitudinal direction 24; and an insert member 26 which also extends in longitudinal direction 24 and which is sealingly inserted into bore 22 to define conduit 14 between various surfaces of outer sleeve 20 and insert member 26. In the illustrated embodiment, an outer surface 21 of outer sleeve 20 is provided with a hexagonal cross-section which is useful for mounting heating elements 46 thereupon. This is not necessary, however and outer surface 21 of outer sleeve 20 may be provided with other cross-sectional shapes. In the illustrated embodiment, bore 22 comprises a circular cross-section, but this is not necessary and in some embodiments, bore 22 may comprise a differently shaped cross-section.

Outer sleeve 20 and insert member 26 may be fabricated from a material with a high thermal conductivity. In particular embodiments, outer sleeve 20 and insert member 26 may be fabricated from copper, silver, nickel-coated aluminum, carbon nanotubes and/or the like. In some embodiments, outer sleeve 20 and insert member 26 are fabricated from materials having thermal conductivities greater than 100 W/mK. In some embodiments, outer sleeve 20 and insert member 26 are fabricated from materials having thermal conductivities that are greater than 200 times the thermal conductivity of the fluid for which they are designed (e.g. 200 times the thermal conductivity of water).

Heater 10 also comprises one or more heating elements 46. In the illustrated embodiment, heater 10 comprises six heating elements 46A-46G (collectively, heating elements 46). In the case of the illustrated embodiment, heating elements 46 comprise semiconductor heating elements (e.g. transistors), but this is not necessary. In some embodiments, heating elements 46 could be provided by other electrical heating elements (e.g. resistive heating elements, printed conductor heating elements and/or the like) or other types of heating elements (e.g. gaseous heating elements and/or the like). Advantageously, when used in a control context (e.g. to provide a controllable amount of heat), semiconductor heating elements need not be switched with relays or semiconductor switches, as is the case with most typical resistive heating elements. Consequently, for semiconductor heating elements, no heat is lost to such switching elements. Heating elements 46 are mounted to outer surface 21 of outer sleeve 20 in a manner (e.g. soldering) which provides a highly thermally conductive contact to facilitate heat transfer from heating elements 46 to outer sleeve 20.

In the illustrated embodiment of FIGS. 1-3B, insert member 26 comprises a central longitudinally extending core 28 and a generally helical-shaped wall 30 that extends outwardly away from an outer surface 32 of core 28. In the description of FIGS. 1-3B and any accompanying claims, the words outward, outwardly, outer and similar words should be understood to refer to directions orthogonal to longitudinal direction 24 and pointing away from center line 40 (e.g. radially in the specific case of the illustrated embodiment, where core 28 and bore 22 have a round cross-section), unless the context dictates otherwise. Similarly, in the description of FIGS. 1-3B and any accompanying claims, the words inward, inwardly, inner and similar words should be understood to refer to directions orthogonal to longitudinal direction 24 and pointing toward center line 40 (e.g. radially in the specific case of the illustrated embodiment, where core 28 and bore 22 have a round cross-section), unless the context dictates otherwise. In currently preferred embodiments, core 28 and helical-shaped wall 30 are integrally formed (i.e. from a monolithic piece of material), although this is not necessary. In some embodiments, core 28 and helical-shaped wall 30 may be formed and joined together with a highly heat conductive joint. Wall 30 comprises side surfaces 34A, 34B (together, side surface 34) and an outer surface 36. When insert member 26 is inserted into bore 22 of outer sleeve 20, outer surface 36 of wall 30 abuts against bore defining surface 38 of outer sleeve 20 to define helical-shaped conduit 14 between bore-defining surface 38, outer surface 32 of core 28 and side surfaces 34 of wall 30.

In some embodiments, over 90% of the length of conduit 14 between inlet port 16 and outlet port 18 is defined by bore-defining surface 38, outer surface 32 of core 28 and side surfaces 34 of wall 30—e.g. substantially all of conduit 14 except for tail sections 42, 44 (FIG. 3A) adjacent inlet 16 and outlet 18 respectively. In some embodiments, over 80% of the length of conduit 14 between inlet port 16 and outlet port 18 is defined by bore-defining surface 38, outer surface 32 of core 28 and side surfaces 34 of wall 30.

As discussed above, insert member 26 is sealingly inserted into bore 22 of outer sleeve 20. The fit between bore-defining surface 38 and outer surface 36 of wall 30 is designed to conduct heat well. Such a heat-conducting and sealing fit between insert member 26 and outer sleeve 20 may be achieved by press-fitting insert member 26 into bore 22 and/or crimping outer sleeve 20 after insertion of insert member 26 into bore 22, for example. Such press-fitting and/or crimping may involve deformation of one or both of insert member 26 and outer sleeve 20. In some embodiments, a gap-filling, heat-conducting solder and/or similar heat-conducting joint material 39 may be used between contact surfaces of insert member 26 and outer sleeve 20 (e.g. between bore-defining surface 38 and outer surface 36 of wall 30). Press-fitting and/or the use of heat-conducting joint material may minimize microscopic air bubbles between bore-defining surface 38 and outer surface 36 of wall 30 and thereby maximize (or otherwise increase in a relative sense) heat conduction between outer sleeve 20 and insert member 26. Another feature that may be used to maximize (or otherwise increase in a relative sense) heat conduction between outer sleeve 20 and insert member 26 is providing sufficient contact area between bore-defining surface 38 and outer surface 36 of wall 30. This contact area may be related to the parameters a, c and d discussed in more detail below.

Providing a relatively large heat conductivity (and capacity for a large amount of heat conduction) between outer sleeve 20 and insert member 26 permits both outer sleeve 20 and insert member 26 to contribute to heating the fluid in conduit 14. Specifically, heat is conducted from heating elements 46, through outer sleeve 20 (which may be made of a highly thermally conductive material (e.g. copper, silver and/or the like) as discussed above), through the heat-conductive interface between outer sleeve 20 and insert member 26 to insert member 26 (which may also be made of a highly thermally conductive material (e.g. copper, silver and/or the like)). Once the heat is transferred to insert member 26, the various conduit-defining surfaces of insert member 26 (e.g. outer surface 32 of core 28 and side surfaces 34 of wall 30) and outer sleeve 20 (e.g. bore-defining surface 38) may all contribute to the heating of fluid in conduit 14. This feature contrasts with prior art heaters that provide an insert in a sleeve, but conduct heat principally from the sleeve without maximizing the heat transfer to the insert and thereby do not permit the insert to contribute significantly to the heating of the fluid. In some embodiments, all of the surfaces of the conduit-defining body that actually define the conduit may contribute significantly to heating the fluid in the conduit. In some embodiments, the various conduit-defining surfaces of insert member 26 (e.g. outer surface 32 of core 28 and side surfaces 34 of wall 30) and outer sleeve 20 (e.g. bore-defining surface 38) may contribute to heating the fluid in conduit 14 in approximately equal proportion to their conduit-defining surface areas. In some such embodiments, for at least 80% of the length of the conduit, the variation in heat flux over the conduit defining surfaces of insert member 26 (e.g. outer surface 32 of core 28 and side surfaces 34 of wall 30) and outer sleeve 20 (e.g.

bore-defining surface 38) may be less than 20%. In some such embodiments, this heat flux variation is less than 10%.

In the illustrated embodiment, as shown best in FIG. 3B, conduit 14 has a generally rectangular cross-section (e.g. with slightly rounded corners) having dimensions a (along longitudinal direction 24) and b (along the inward/outward direction). This is not necessary. In some embodiments, bore 14 may be defined with different cross-sectional shapes. In the illustrated embodiment, helical-shaped wall 30 has a generally rectangular cross-section (e.g. with slightly rounded corners) having dimensions b (in the inward/outward direction) and c (along longitudinal direction 24). This is not necessary. In some embodiments, wall 30 may be provided with different cross-sectional shapes. In the case of the illustrated embodiment, the pitch of helical-shaped wall 30 (and the corresponding pitch of conduit 14) along longitudinal direction 24 is given by d=a+c. In the illustrated embodiment, the diameter of core 28 of insert member 26 has the dimension e and the diameter of bore 22 and the total diameter of insert member 26 (including core 28 and wall 30) have the dimension e+2b.

Figure 1:
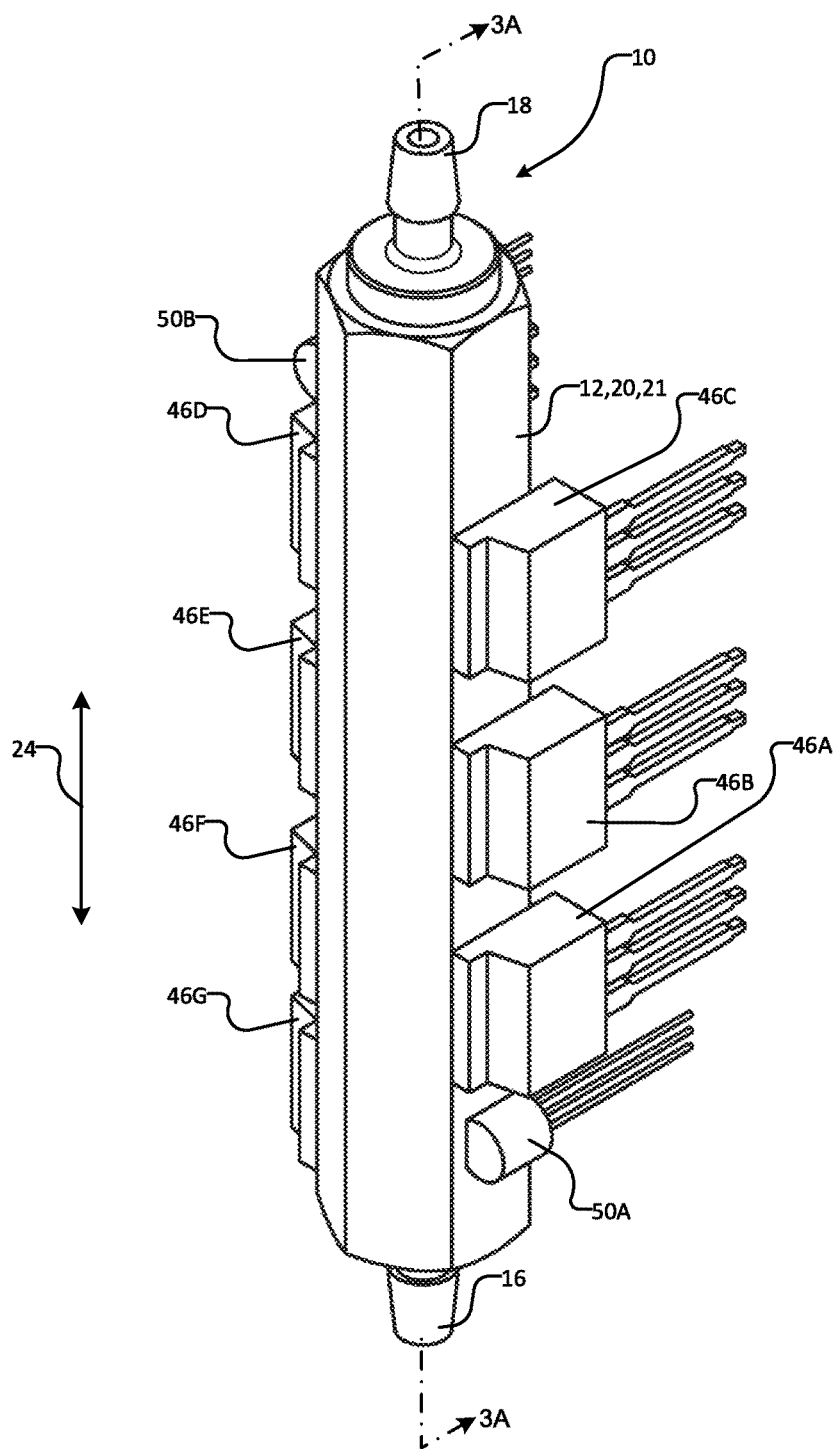
FIG. 1 is an isometric view of a flow-through heater according to a particular embodiment of the invention.
Figure 2:
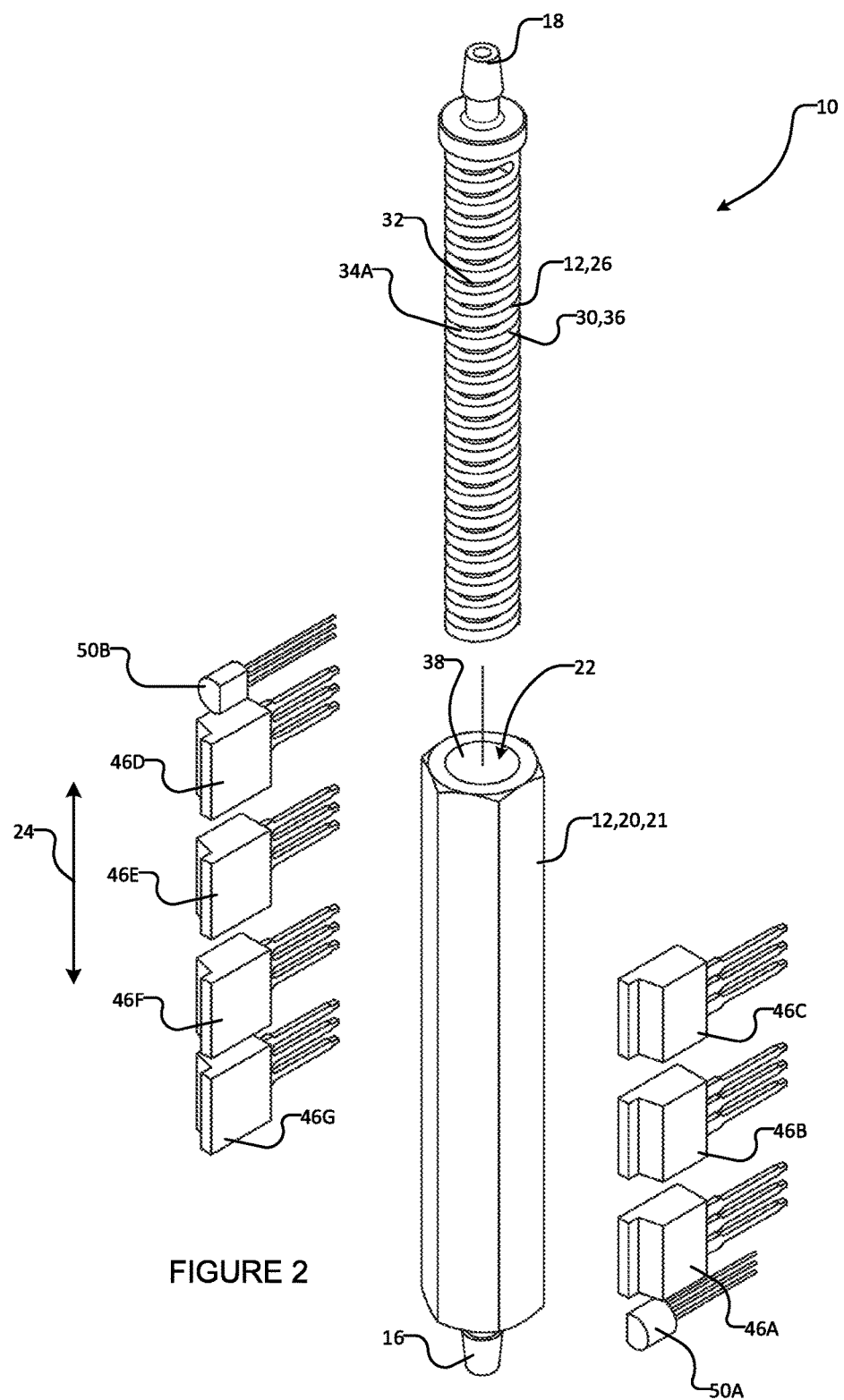
FIG. 2 is an exploded isometric view of the FIG. 1 heater.

FIGS. 7A, 7B, 7C, 7D (collectively, FIG. 7) show experimental heat-flux model results for a portion of the FIG. 1 heater 10 having various relative conduit dimensions. FIG. 7 shows simulation results of heat flux for the upper half of conduit-defining body 12 of heater 10 of FIGS. 1-3B (i.e. the portion of conduit defining body 12 above center line 40 shown in FIG. 3A). The white regions in FIG. 7 represent conduit 14. In FIG. 7, the heat flux (in $10^6$ W/m$^2$) is shown in grey-scale with darker regions showing more flux density and lighter regions showing less flux density. The FIG. 7 simulations were conducted under conditions where the input power was 250 W, the fluid temperature at inlet 16 was 283K, the fluid temperature at outlet 18 was 363K and the temperature was controlled to +/−2K.

Figure 7A:
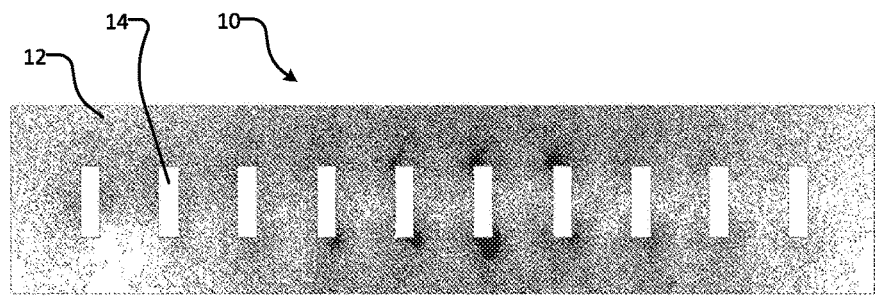
FIGS. 7A, 7B, 7C, 7D show heat-flux model results for a portion of the FIG. 1 heater having various relative conduit dimensions.
Figure 7B:
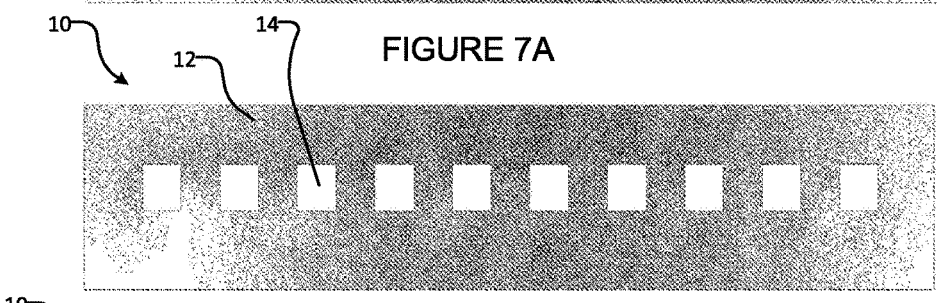
Figure 7C:
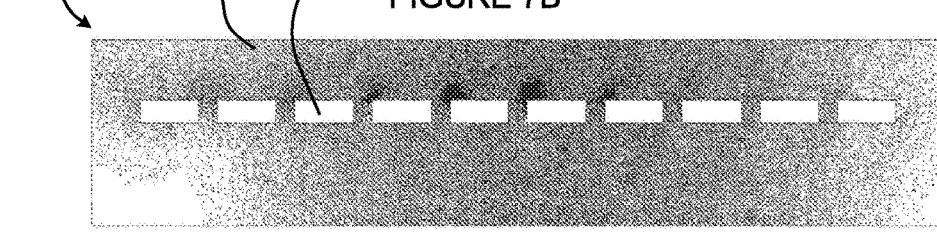

For each of the simulations of FIGS. 7A-7D, the total conduit surface area (i.e. (2a+2b)L, where L is the total length of conduit 14) was maintained constant. For a given input power, maintaining a constant total conduit surface area equalizes the watt density for the FIG. 7 experiments. It can be seen, however, that the model simulations of each of FIGS. 7A, 7B, 7C, 7D were conducted with different relative conduit dimensions a, b, c, d. Specifically (referring to FIG. 3B), FIG. 7A shows a model simulation where a=x, b=4x, c=3x, d=4x; FIG. 7B shows a model simulation where a=2x, b=2x, c=2x, d=4x; and FIG. 7C shows a model simulation where a=3x, b=x, c=x; d=4x. In the particular non-limiting case of the illustrated simulation x=0.8 mm.

Comparing FIGS. 7A, 7B and 7C it can be seen that where the dimensions b, a are relatively close to one another (as is the case for FIG. 7B), the heat flux is relatively even for all surfaces of conduit 14 (at least at surfaces away from the inlet and outlet edges of heater 10) and the peak heat flux is relatively low. In particular, the heat gradient in the inward-outward direction is relatively low in FIG. 7B, where the dimensions b, a are relatively close to one another. These features contrast with the situation where the conduit dimensions b and a are different from one another (as is the case for FIG. 7A and 7C). FIGS. 7A and 7C show relatively high peaks of heat flux at the inner and outer sides of conduit 14 for FIG. 7A and at the outer sides of conduit 14 for FIG. 7C. These relatively high peaks are higher than the peaks in the case of FIG. 7B. Further, for each of FIGS. 7A and 7C, the variation in heat flux between the different surfaces of conduit 14 exhibits relatively more variation than the case of FIG. 7B. For example, in FIG. 7A, the heat flux is relatively high on the narrow (inner and outer) surfaces of conduit 14 and is relatively low on the wider (longitudinal) surfaces of conduit 14. In FIG. 7C, the heat flux is relatively high on the outer surfaces of conduit 14 and is relatively low on the longitudinal and inner surfaces of conduit 14. These regions of high heat flux can lead to undesirable nucleate boiling. The large variations in heat flux can cause an inability to accurately control the temperature of the fluid in conduit 14.

Figure 7D:
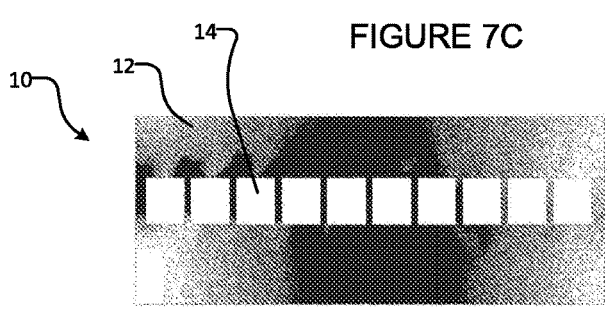

As discussed above, FIG. 7B shows a model simulation where a=2x, b=2x, c=2x, d=4x. FIG. 7D shows a model simulation where a=2x, b=2x, c=0.5x and d=2.5x. Comparing FIGS. 7B and 7D it can be seen that where the dimensions a and c are relatively close to one another (as is the case for FIG. 7B), the heat flux is relatively even for all surfaces of conduit 14 (at least at surfaces away from the inlet and outlet edges of heater 10) and the peak heat flux is relatively low. In contrast, in FIG. 7D (where the dimension c is relatively small in comparison to a), there are large regions of high heat flux and the heat flux is relatively highly variable. This may be because there is insufficient volume of conduit-defining body 12 to distribute the heat from heating elements 46. As is the case for FIGS. 7A and 7C, these regions of high heat flux in FIG. 7D can lead to undesirable nucleate boiling and the large variations in heat flux in FIG. 7D can cause an inability to accurately control the temperature of the fluid in conduit 14.

The FIG. 7 experiments demonstrate the desirability (although not the necessity) of fabricating heater 10 with desirable relative dimensional characteristics. Provided that there is high thermal conductivity contact between sleeve 20 and insert member 26, such relative dimensions may minimize regions of the conduit-defining surface(s) (e.g. outer surface 32 of core 28, side surfaces 34 of wall 30 and bore-defining surface 38 of sleeve 20) having high heat flux and may minimize heat flux variation over the conduit-defining surface(s). In some embodiments, the conduit defining surfaces are dimensioned such that $0.3 \le a/b \le 3$. In some embodiments, the conduit defining surfaces are dimensioned such that $0.8 \le a/b \le 1.2$. In some embodiments, the conduit-defining surfaces are dimensioned such that $0.3 \le c/a \le 3$. In some embodiments, the conduit-defining surfaces are dimensioned such that $0.8 \le c/a \le 1.2$. In some embodiments, the conduit-defining surfaces are dimensioned such that $0.8 \le c/b \le 1.2$. In some embodiments, it is desirable that a≈b≈c—e.g. the dimensions a, b and c may be within 20% of one another.

Provided that there is high thermal conductivity contact between sleeve 20 and insert member 26, such relative dimensions may minimize regions of the conduit-defining surface(s) having high heat flux and may minimize heat flux variation over the conduit-defining surface(s). In some embodiments, the various conduit-defining surfaces of insert member 26 (e.g. outer surface 32 of core 28 and side surfaces 34 of wall 30) and outer sleeve 20 (e.g. bore-defining surface 38) may contribute to heating the fluid in conduit 14 in approximately equal proportion to their conduit-defining surface areas. In some such embodiments, for at least 80% of the length of the conduit, the variation in heat flux over the conduit defining surfaces of insert member 26 (e.g. outer surface 32 of core 28 and side surfaces 34 of wall 30) and outer sleeve 20 (e.g. bore-defining surface 38) may be less than 20%. In some such embodiments, this heat flux variation is less than 10%.

As discussed above, heater 10 comprises heating elements 46. In the illustrated embodiment, heater 10 comprises an optional inlet pressure sensor 48A near inlet port 16 and an optional outlet pressure sensor 48B near outlet port 18. Heater 10 may also comprise an optional inlet temperature sensor 50A near inlet port 16 and an optional outlet temperature sensor 50B near outlet port 18. Pressure and temperature information from these sensors 48, 50 may be used by a suitably configured controller (e.g. one or more computers, processors, programmable logic arrays and/or the like (not shown in FIGS. 1-3B)) to control the heat generated by heating elements 46, the rate of flow of fluid through heater 10 or both. In the case of the illustrated embodiment, where heating elements 46 comprise semi-conductor heating elements, control of the heat generated by heating elements 46 may be effected using an analog or digital control circuit by controlling the drive current available to heating elements 46 through the relatively low power control signals required by these elements such as the gate voltage or base current of MOSFET's, IGBT's, Bipolar transistors and/or the like. Suitable controllable valves, pumps and/or the like (not expressly shown) may be used to control flow rate of fluid through heater 10.

Figure 6A:
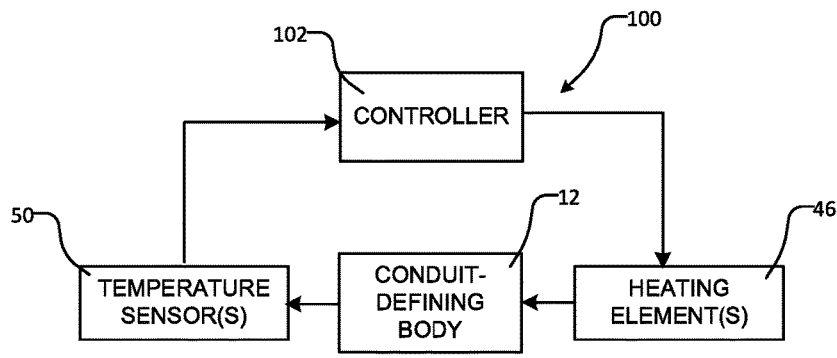
FIGS. 6A, 6B and 6C are respectively schematic temperature and pressure control systems according to particular example embodiments.

FIG. 6A is a schematic block diagram of a heater control system 100 according to a particular example embodiment. Heater control system 100 of the FIG. 6A embodiment comprises temperature sensors 50 which detect the temperature of conduit-defining body 12 and controllable heating elements 46 which supply heat to conduit-defining body 12. Control system 100 is implemented by controller 102. Controller 102 may comprise any suitable controller, such as, for example, a suitably configured computer, microprocessor, microcontroller, field-programmable gate array (FPGA), other type of programmable logic device, pluralities of the foregoing, combinations of the foregoing, and/or the like. Controller 102 may have access to software instructions which may be stored in computer-readable memory accessible to controller 102 and/or in computer-readable memory (not shown) that is integral to controller 102. Controller 102 may be configured to read and execute software instructions and, when executed by controller 102, such software may cause controller 102 to implement one or more of the methods described herein. It is not necessary that controller 102 comprise a digital controller. In some embodiments, controller 102 may comprise a suitably configured analog electronic and/or mechanical control circuit.

In the FIG. 6A embodiment, system 100 controls the temperature of conduit-defining body 12 based on feedback from temperature sensors 50 and the amount of heat generated by heating elements 46. For example, if temperature sensors 50 measure a temperature that is determined by controller 102 to be too high, then controller 102 may control heating elements 46 to reduce the amount of heat supplied (e.g. by reducing the amount of power dissipated by heating elements 46) and to thereby reduce the temperature Similarly, if temperature sensors 50 measure a temperature that is determined by controller 102 to be too low, then controller 102 may control heating elements 46 to increase the amount of heat supplied and to thereby increase the temperature. Temperature sensors 50 may comprise one or more individual temperature sensors. Temperature sensors 50 may be in thermal contact with conduit-defining body 12 and may sense the temperature of conduit-defining body 12 as a proxy for the temperature of the fluid (e.g. at the outlet 18) in conduit 14. The temperature of the fluid (e.g. at the outlet 18) in conduit 14 may be estimated from the temperature of conduit-defining body 12, although this is not necessary. In some embodiments, temperature sensors 50 may additionally or alternatively measure the temperature of the fluid directly. Suitable signal conditioning circuitry (e.g. amplifiers, filters, buffers and/or the like) may be connected between sensors 50 and controller 102, as is known in the art but not expressly shown in FIG. 6A.

In some embodiments, for a given rate of flow and a given initial fluid temperature, controller 102 may receive feedback from temperature sensors 50 about the temperature of conduit-defining body 12 and may use such feedback to control the amount of heat imparted on the fluid as it travels from inlet 16 to outlet 18 of conduit 14 and may thereby track a desired temperature at outlet 18. In some embodiments, the input fluid temperature and/or the fluid flow rate through conduit 14 may vary and controller 102 may receive feedback from temperature sensors 50 about the temperature of conduit-defining body 12 and may use such feedback to control the amount of heat imparted on the fluid as it travels from inlet 16 to outlet 18 of conduit 14 and may thereby track a desired temperature at outlet 18. In some embodiments, controller 102 controls the amount of heat imparted on the fluid as it travels from inlet 16 to outlet 18 of conduit 14 by controllably varying the heat output of heating elements 46. The heat output of heating elements 46 may be controllably varied by controllably varying the current, duty cycle and/or the like of a drive signal provided to heating elements 46. Where the amount of heat imparted on the fluid as it travels from inlet 16 to outlet 18 of conduit 14 is controlled by controllably varying the heat output of heating elements 46, the flow rate of the fluid through conduit 14 may be maintained constant, although this is not necessary. The flow rate may be maintained constant by a suitable flow control element (not shown in FIG. 6A) and/or by controller 102 which may implement open or closed loop control to maintain constant flow rate using such a flow control element. In some embodiments, controller 102 controls the amount of heat imparted on the fluid as it travels from inlet 16 to outlet 18 of conduit 14 by controllably varying a rate of fluid flow through conduit 14. The rate of fluid flow through conduit 14 may be controllably varied by controllably varying the current, duty cycle and/or the like of a drive signal provided to a flow control element (not shown in FIG. 6A), such as one or more suitable pumps, valves and/or the like). Where the amount of heat imparted on the fluid as it travels from inlet 16 to outlet 18 of conduit 14 is controlled by controllably varying the flow rate through conduit 14, the heat output of heating elements 46 may be maintained constant, although this is not necessary. The heat output of heating elements 46 may be maintained constant by controller 102 which may implement open or closed loop control to maintain constant heat output of heating elements 46. In currently preferred embodiments, temperature control system 100 is configured to avoid boiling. As discussed above, this may be effected by ascertaining a maximum power for a given conduit wall area to ensure that the power density (watt density) is less than a threshold (known for given fluids) which will permit nucleate boiling. Further, temperature control system 100 may reduce the input power below the set maximum value, or modulate the fluid flow rate through heater 10, or both, to heat the fluid to a desired temperature within narrow tolerances below the boiling point as it exits from outlet 18 of conduit 14.

Figure 6B:
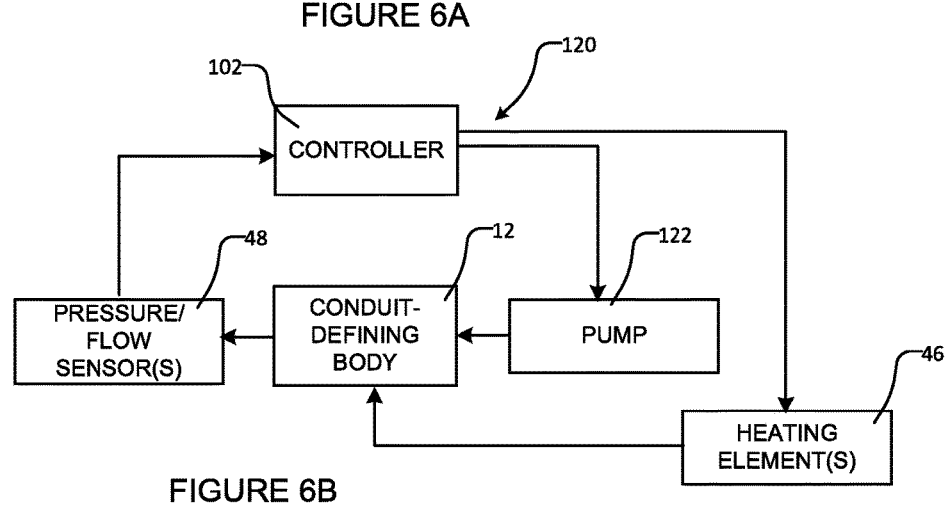

FIG. 6B is a schematic block diagram of a heater control system 120 according to a particular example embodiment. Heater control system 120 of the FIG. 6B embodiment comprises pressure (and/or flow) sensor(s) 48 which provide feedback to controller 102 about the flow rate of fluid through conduit 14. Suitable signal conditioning circuitry (e.g. amplifiers, filters, buffers and/or the like) may be connected between sensors 48 and controller 102, as is known in the art but not expressly shown in FIG. 6B. In the FIG. 1-3B embodiment of heater 10, pressure sensors 48A, 48B are respectively provided near the inlet 16 and outlet 18. Note that pressure sensors 48A, 48B are not expressly shown in the illustrations of FIGS. 1 and 2. Together, these pressure sensors 48 permit a measurement (e.g. controller 102 to provide an estimate) of the flow rate of fluid through conduit 14. This is due to conduit 14 presenting resistance to the flow of liquid which, according to Bernoulli's principle, leads to a pressure differential between inlet 16 and outlet 18 of heater 10. From the pressure differential, controller 102 may determine a flow rate of liquid through heater 10. In other embodiments, other types of flow rate sensors 48 may be used to obtain an indication of the rate of fluid flow through conduit 14. Such other types of flow rate sensors can be positioned at or near inlet 16, at or near outlet 18 and/or at other suitable location(s) within the conduit supplying liquid to heater 10 or conveying liquid away from heater 10. Flow control system 120 of the illustrated embodiment also comprises a controllable pump 122 (or similar flow-control element 122) which can be used to change the pressure/flow rate of fluid through conduit 14. In some embodiments, pump 122 may be replaced by (or may comprise) suitable controllable valves which can similarly be used to control the pressure and/or flow rate of fluid through conduit 14. Control system 120 is implemented by controller 102, which may have characteristics similar to (and may be the same controller as) controller 102 of the FIG. 6A temperature control system 100.

In some embodiments, for a given initial fluid temperature, controller 102 may receive feedback from pressure/flow rate sensors 48 about the flow rate of fluid through conduit 14 and may use such feedback to control the amount of heat imparted on the fluid as it travels from inlet 16 to outlet 18 of conduit 14 and may thereby track a desired temperature at outlet 18. In some embodiments, the input fluid temperature and/or the fluid flow rate through conduit 14 may vary and controller 102 may receive feedback from pressure/flow rate sensors 48 about the flow rate of fluid through conduit 14 and may use such feedback to control the amount of heat imparted on the fluid as it travels from inlet 16 to outlet 18 of conduit 14 and may thereby track a desired temperature at outlet 18. In some embodiments, controller 102 controls the amount of heat imparted on the fluid as it travels from inlet 16 to outlet 18 of conduit 14 by controllably varying the heat output of heating elements 46. The heat output of heating elements 46 may be controllably varied by controllably varying the current, duty cycle and/or the like of a drive signal provided to heating elements 46. Where the amount of heat imparted on the fluid as it travels from inlet 16 to outlet 18 of conduit 14 is controlled by controllably varying the heat output of heating elements 46, the flow rate of the fluid through conduit 14 may be maintained constant, although this is not necessary. The flow rate may be maintained constant by controller 102 which may implement open or closed loop control to maintain constant flow rate using flow control element 122. In some embodiments, controller 102 controls the amount of heat imparted on the fluid as it travels from inlet 16 to outlet 18 of conduit 14 by controllably varying a rate of fluid flow through conduit 14. The rate of fluid flow through conduit 14 may be controllably varied by controllably varying the current, duty cycle and/or the like of a drive signal provided to a flow control element 122. Where the amount of heat imparted on the fluid as it travels from inlet 16 to outlet 18 of conduit 14 is controlled by controllably varying the flow rate through conduit 14, the heat output of heating elements 46 may be maintained constant, although this is not necessary. The heat output of heating elements 46 may be maintained constant by controller 102 which may implement open or closed loop control to maintain constant heat output of heating elements 46. In some embodiments, flow rate sensors 48 may be used to gate the application of heat by heating elements 46. For example, to avoid damaging heater 10, controller 102 may maintain heating elements 46 at a low (e.g. zero or below a suitable threshold) heat output level until flow rate sensors 48 detect flow in conduit 14 and then controller 102 may drive heating elements 46 at a higher level to achieve the heating objectives of heater 10. In currently preferred embodiments, temperature control system 100 is configured to avoid boiling. As discussed above, this may be effected by ascertaining a maximum power for a given conduit wall area to ensure that the power density (watt density) is less than a threshold (known for given fluids) which will permit nucleate boiling. Further, temperature control system 100 may reduce the input power below the set maximum value, or modulate the fluid flow rate through heater 10, or both, to heat the fluid to a desired temperature within narrow tolerances below the boiling point as it exits from outlet 18 of conduit 14.

Figure 6C:
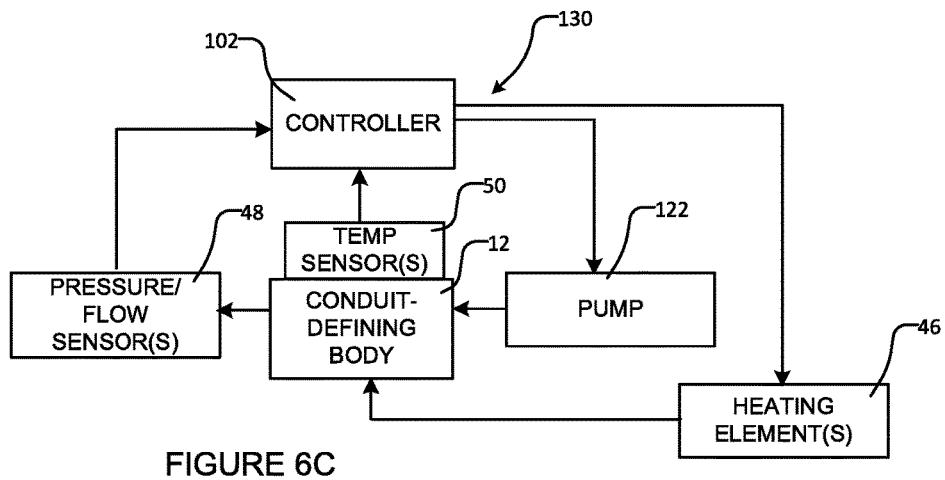

FIG. 6C is a schematic block diagram of a heater control system 130 according to a particular example embodiment. Heater control system 130 differs from systems 100 (FIG. 6A) and 120 (FIG. 6B) in that system 130 comprises both temperature sensors 50 and flow rate/pressure sensors 48. Temperature sensors 50 may be substantially similar to temperature sensors 50 described above for system 100. Flow rate/pressure sensors 48 may be substantially similar to flow rate/pressure sensors 48 described above for system 120. Accordingly, system 130 may provide any of the functionality of systems 100, 120 described herein. In providing such functionality, system 130 may incorporate one or both temperature feedback (from sensors 50) and/or flow rate feedback (from sensors 48). It will be appreciated by those skilled in the art that additional functionality may be provided using a combination of temperature feedback and flow rate feedback.

Figure 6D:
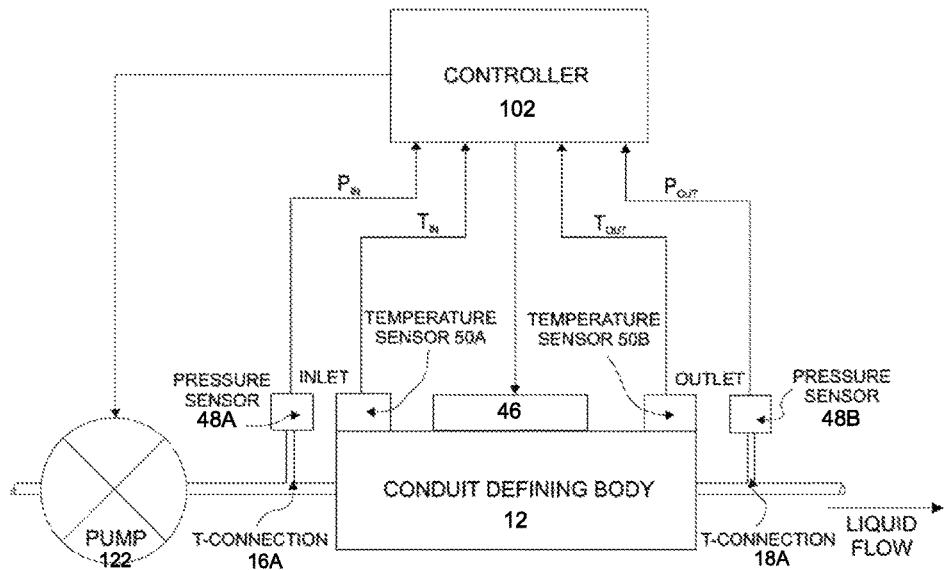
FIGS. 6D to 6G are schematic heater control systems according to particular example embodiments.

FIG. 6D depicts a schematic diagram of a heater control system according to one embodiment of the invention. A first pressure sensor 48A is attached via t-connection 16A located at or near inlet 16 of conduit defining body 12 and a second pressure sensor 48B is attached via t-connection 18A located at or near outlet 18 of conduit defining body 12. In some embodiments, t-connections 16A, 18A are external to heater 10 (e.g. spliced into the fluid line immediately upstream from inlet 16 and downstream from outlet 18 respectively), while in other embodiments, pressure sensors 48A, 48B may be provided internally to heater 10. In some embodiments, t-connections 16A, 18A may be replaced by other suitable connectors. First and second pressure sensors 48A, 48B may transmit output signals to controller 102 for determining a pressure differential and ultimately the flow rate of fluid through conduit defining body 12 as described elsewhere herein. A first temperature sensor 50A may also be provided near inlet 16 (e.g. in thermal contact with inlet 16 and/or in thermal contact with a conduit section a suitable distance upstream from inlet 16) while a second temperature sensor 50B may be provided near outlet 18 (e.g. in thermal contact with outlet 18 and/or in thermal contact with a a conduit section a suitable distance downstream from outlet 18). The temperature of inlet 16, outlet 18 and/or the conduit sections upstream from inlet 16 and downstream from outlet 18 may be used as a proxy for the temperature of fluid at these locations. In some embodiments, it may be desirable to have differential temperature measurements as between inlet 16 and outlet 18. In such cases, it may be desirable to provide insulation between temperature sensors 50 and conduit-defining body 12 and/or to otherwise provide relatively high thermal resistance between temperature sensors 50 and conduit-defining body 12 as compared to the thermal resistance between temperature sensors 50 inlet 16, outlet 18 and/or the conduit sections upstream from inlet 16 and downstream from outlet 18. In some embodiments, temperature sensors 50 may additionally or alternatively measure the temperature of the fluid directly. Suitable signal conditioning circuitry (e.g. amplifiers, filters, buffers and/or the like) may be connected between sensors 48A, 48B, 50A, 50B and controller 102, as is known in the art but not expressly shown in FIG. 6C. Using the information from pressure sensors 48A, 48B and temperature sensors 50A, 50B, controller 102 may control pump 122 and/or heating elements 46 to achieve a desired fluid temperature at outlet 18, as discussed herein.

Figure 6E:
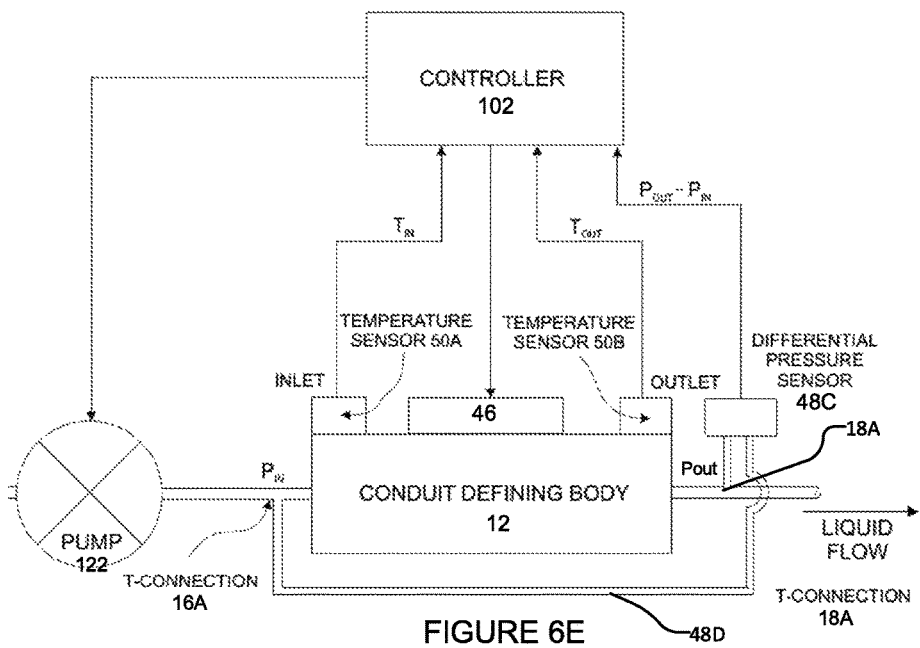

FIG. 6E depicts a schematic diagram of a heater control system according to another embodiment of the invention. Similar to the FIG. 6D embodiment, the FIG. 6E embodiment comprises a first temperature sensor 50A at or near inlet 16 and a second temperature sensor 50B at or near outlet 18. Temperature sensors 50 of the FIG. 6E embodiment may have features that are the same as those of temperature sensors 50 of the FIG. 6D embodiment. However, unlike the FIG. 6D embodiment, the FIG. 6E embodiment employs a differential pressure sensor 48C instead of individual pressure sensors. In the illustrated embodiment of FIG. 6E, differential pressure sensor 48C is connected to conduit 14 at or near inlet 16 by way of a conduit 48D attached at t-connection 16A and is connected to conduit 14 at or near outlet 18 by way of t-connection 18A. Using the pressure at t-connection 16A and at t-connection 16B, differential pressure sensor 48C may determine the pressure differential across conduit defining body 12. Suitable signal conditioning circuitry (e.g. amplifiers, filters, buffers and/or the like) may be connected between sensors 48C, 50A, 50B and controller 102, as is known in the art but not expressly shown in FIG. 6D.Using the information from differential pressure sensor 48C and temperature sensors 50A, 50B, controller 102 may control pump 122 and heating elements 46 to achieve a desired fluid temperature at outlet 18, as discussed herein. By employing a differential pressure sensor 48C, accuracy and precision may be improved relative to individual pressure sensors 48A, 48B by, for example, reducing drift errors that occur when separate sensors 48A, 48B have different temperatures.

Figure 6F:
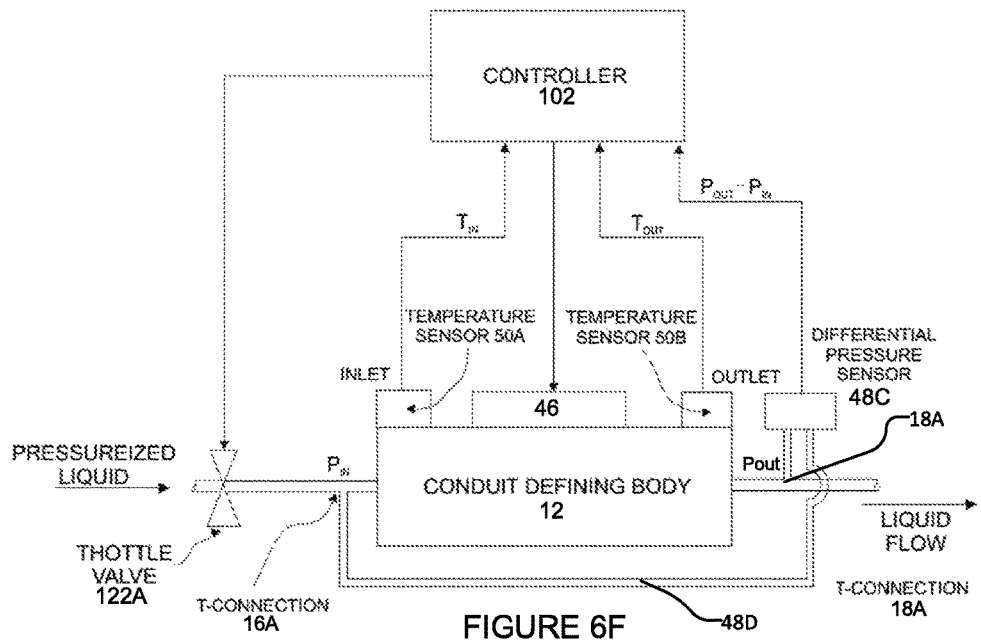

FIG. 6F depicts a schematic diagram of a heater control system according to another embodiment of the invention. Similar to the FIGS. 6D and 6E embodiments, the FIG. 6F embodiment comprises a first temperature sensor 50A at or near inlet 16 and a second temperature sensor 50B at or near outlet 18. Temperature sensors 50 of the FIG. 6F embodiment may have features that are the same as those of temperature sensors 50 of the FIG. 6D embodiment. Similar to the FIG. 6E embodiment, the FIG. 6F embodiment employs a differential pressure sensor 48C. However, unlike the FIG. 6D and 6E embodiments, the liquid flowing to inlet 16 is pressurized and the flow rate of such fluid is controlled by a flow control element 122A (in the illustrated example embodiments, a throttle valve 122A). Throttle valve 122A may be controlled by controller 102. By opening throttle valve 122A, the flow of fluid to inlet 16 may be increased. Conversely, by closing throttle valve 122A, the flow of fluid to inlet 16 may be decreased. Using the information from differential pressure sensor 48C and temperature sensors 50A, 50B, controller 102 may control throttle valve 122A and/or heating elements 46 to achieve a desired fluid temperature at outlet 18, as discussed herein. As discussed elsewhere herein, in some embodiments, other flow control elements (e.g. a pump and/or the like) may be used in addition to or in the alternative of throttle valve 122A.

Figure 6G:
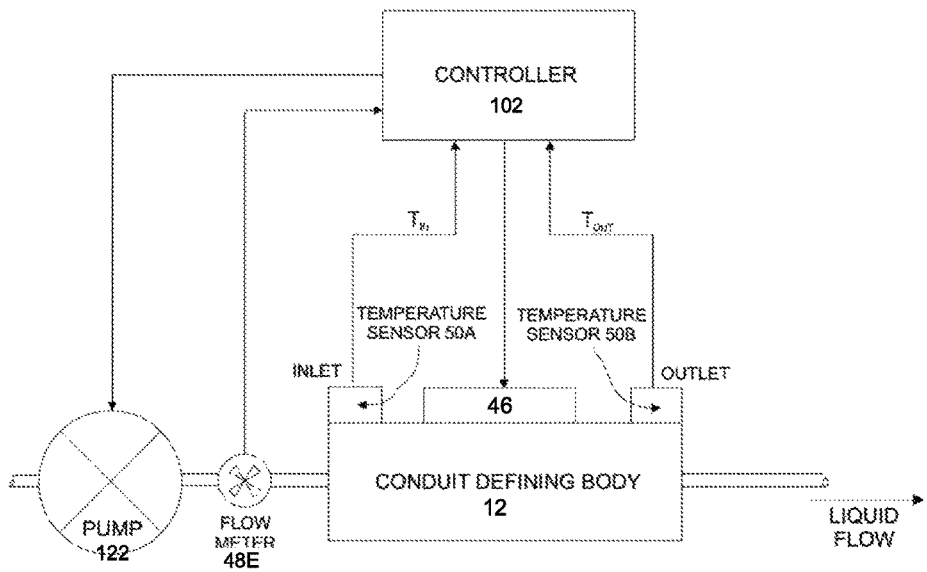

FIG. 6G depicts a schematic diagram of a heater control system according to another embodiment of the invention. Similar to the FIG. 6D, 6E and 6F embodiments, the FIG. 6G embodiment comprises a first temperature sensor 50A at or near inlet 16 and a second temperature sensor 50B at or near outlet 18. Temperature sensors 50 of the FIG. 6G embodiment may have features that are the same as those of temperature sensors 50 of the FIG. 6D embodiment. However, unlike the FIG. 6D, 6E and 6F embodiments, the FIG. 6E embodiment employs a flow meter 48E, which may be located at or near inlet 16 or at any other suitable location in the fluid line of heater 10, to directly measure the rate of fluid flow into inlet 16. Suitable signal conditioning circuitry (e.g. amplifiers, filters, buffers and/or the like) may be connected between sensors 48E, 50A, 50B and controller 102, as is known in the art but not expressly shown in FIG. 6G. Using the information from flow meter 48E and temperature sensors 50A, 50B, controller 102 may control a flow control element 122 (in the illustrated example embodiment, pump 122) and/or heating elements 46 to achieve a desired fluid temperature at outlet 18, as discussed herein. It should be understood by one skilled in the art that pump 122, throttle valve 122A, pressure sensors 48A, 48B, differential pressure sensor 48C and flow meter 48E may be employed in a flow control system in any suitable combination and that FIGS. 6A-6G are merely exemplary embodiments.

The embodiments of FIGS. 6D-6G may use any of the control schemes described above for any of FIG. 6A-6C or any combination thereof to achieve desired control objectives for heater 10.

In some embodiments, elements of heater control system 100 (FIG. 6A) and heater control system 120 (FIG. 6B) may be used together (e.g. in any of the embodiments of FIGS. 6C-6G) to control the amount of heat imparted on the fluid as it travels from inlet 16 to outlet 18 of conduit 14. In some embodiments, heater control system 100 can be implemented independently of heater control system 120. For example, pump 122 can be configured to run "open loop" at one of one or more discrete levels and the amount of heat imparted on the fluid as it travels from inlet 16 to outlet 18 of conduit 14 can be controlled by heater control system 100 (e.g. by controlling the heat output of heater elements 46). In some embodiments, heater control system 120 can be implemented independently of heater control system 120. For example, heating elements 46 can be configured to run "open loop" at one of one or more discrete levels and the amount of heat imparted on the fluid as it travels from inlet 16 to outlet 18 of conduit 14 can be controlled by heater control system 120 (e.g. by controlling the flow rate using flow control elements 122).

In one particular embodiment, heating elements 46 are driven at their maximum level (i.e. a level that is safe and permits a relatively long operating life for heating elements 46) or at some other suitable constant level (which may be user-configurable, pre-configured for a particular application and/or the like) and the amount of heat imparted on the fluid as it travels from inlet 16 to outlet 18 of conduit 14 can be controlled by controlling the flow rate through conduit 14 using flow control elements 122. For example, in such a system the fluid temperature could be controlled by modulating the rate of flow of fluid through conduit-defining body 12 based on feedback from pressure sensors 48 and temperature sensors 50 by controlling the pressure of the fluid supplied by pump 122. For example, if pressure sensors 48 measure a differential pressure that is determined by controller 102 to be indicative of a flow rate that will lead to undershooting the target temperature, then controller 102 may control pump 122 to reduce the flow rate of fluid supplied to conduit 14 to thereby approach the target temperature relatively quickly yet without undershooting Similarly, if pressure sensors 48 measure a differential pressure that is determined by controller 102 to be indicative of a flow rate that is too low, then controller 102 may control pump 122 to increase the flow rate of fluid supplied to conduit 14 to approach the target temperature less swiftly. Additionally or alternatively, if temperature sensor 50B measures a temperature that is too low or too high as compared to a desired temperature, controller 102 may cause the flow rate to decrease or increase as needed to achieve the desired temperature. Similarly, if temperature sensor 50A measures an increase or decrease in temperature, controller 102 may cause the flow rate to increase or decrease in accordance with a suitable control strategy to achieve the desired temperature. For a given thermal power supplied by heating elements 46 and a given initial fluid temperature, control of the flow rate of fluid through conduit 14 may thereby be used to heat the fluid as it travels from inlet 16 to outlet 18 of conduit 14 in the shortest possible time for such given thermal power.

It may be desirable to heat fluid flowing through heater 10 to a specified temperature (even if the temperature of fluid entering heater 10 is variable) while maintaining a particular rate of fluid flow through heater 10. For example, this may be desired for a hot water on demand shower or for providing hot liquid to feed into a chemical reactor. In such a scenario, controller 102 may be configured to send appropriate signals to pump 122 or throttle 122A to maintain the desired flow rate. Further, by processing the signals from temperature sensors 50A, 50B and sending an appropriate signal to heating elements 46, controller 102 may control the heat output (e.g. the heat output rate) of heating elements 46. Controlling the heat output rate of heating elements 46 allows controller 102 to impart a desired amount of heat to the fluid during the period that the fluid is resident in heater 10 and to accurately achieve the desired fluid temperature at outlet 18. For a particular heater 10 having corresponding physical parameters and for a particular liquid, the heat output rate of heating elements 46 may be constrained to avoid nucleate boiling or heating elements 46 may be selected to have a maximum heat output rate (power) that avoids nucleate boiling. In some embodiments, controller 102 monitors signals from temperature sensor 50A and causes the heating element 46 heat output rate to increase if the temperature at inlet 16 increases or causes the heating element 46 heat output rate to decrease if the temperature at inlet 16 decreases. Similarly, in some embodiments, controller 102 monitors signals from temperature sensor 50B and causes the heating element 46 heat output rate to increase if the temperature at outlet 18 is greater than the desired temperature or causes the heating element 46 heat output rate to decrease if the temperature at outlet 18 less than the desired temperature.

In some embodiments, controller 102 is configured to control both the rate of fluid flow through conduit 14 and the heat output rate of heating elements 46 simultaneously. Controller 102 may do so in a manner than minimizes time and/or energy input for heating the fluid to a desired temperature. In some embodiments, time to heat the liquid is prioritized over energy efficiency while in other embodiments, energy efficiency is prioritized over time to heat the liquid. In some embodiments, the control objectives (and/or constraints) comprise: heating a particular volume of liquid (e.g. as may be specified by a user, a particular application and/or the like) to a desired temperature at output 18 while accommodating fluctuations in temperature at inlet 16 in a period of time that is as short as possible, while avoiding nucleate boiling and avoiding damage to the components of heater 10; and/or providing a particular flow rate of liquid (e.g. as may be specified by a user, a particular application and/or the like) through heater 10 while heating the water to a desired temperature at output 18 while accommodating fluctuations in temperature at inlet 16 in a period of time that is as short as possible, while avoiding nucleate boiling and avoiding damage to the components of heater 10.

The thermal time constant of a body may be defined to be the product of its thermal resistivity $R_{th}$ (in units of mK/W) and its thermal capacitance $C_{th}$ (in units of J/K). Thermal resistivity of a body is a property of the material from which the body is made. Thermal capacitance of a body is a property of both the material from which the body is made and the volume of the body. More particularly, the thermal capacitance $C_{th}$ of a body is given by the product of the specific heat of the material (in units of J/kgK), the density of the material (in units of $kg/m^3$) and the volume of the body (in units of $m^3$). In particular embodiments, heater 10 is designed for use with a particular fluid and the thermal time constant $R_{th}C_{th(body)}$ of the conduit-defining body 12 is selected to be at least approximately equal (e.g. within 10%) to the thermal time constant $R_{th}C_{th(fluid)}$ of the fluid for which heater 10 is intended to be used (based on the assumption that the volume of conduit 14 is filled with fluid). In some embodiments, the thermal time constant $R_{th}C_{th(body)}$ of conduit-defining body 12 is selected to be equal to the thermal time constant of water (based on the assumption that the volume of conduit 14 is filled with water). This selection of thermal time constants may help to facilitate desirable temperature control—e.g. contributing to a relatively rapid thermal response that is controllably stable.

As discussed above, it is desirable to provide conduit-defining body 12 with a thermal conductivity that is relatively high (or thermal resistivity $R_{th}$ that is relatively low). Thus the thermal resistivity $R_{th}$ of the fluid for which heater is designed to be used may be significantly higher than that of conduit-defining body 12. It will be appreciated that for a given fluid, the relative volume of conduit-defining body 12 and/or conduit 14 may be adjusted to provide the at least approximate equality between $R_{th}C_{th(body)}$ and $R_{th}C_{th(fluid)}$. Additionally or alternatively, for a given fluid, the material from which conduit-defining body 12 is fabricated may be adjusted to provide the at least approximate equality between $R_{th}C_{th(body)}$ and $R_{th}C_{th(fluid)}$.

Figure 3C:
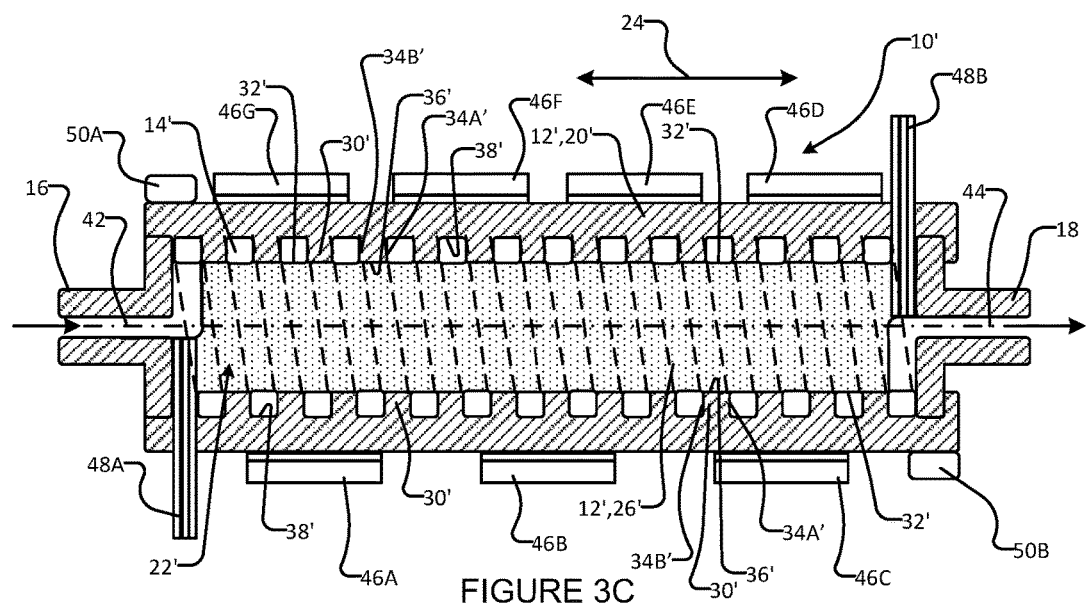
FIG. 3C is a schematic cross-sectional view of a heater according to another embodiment similar to the FIG. 1 heater, except that the helical-shaped wall is integrally formed with the outer sleeve.
Figure 4:
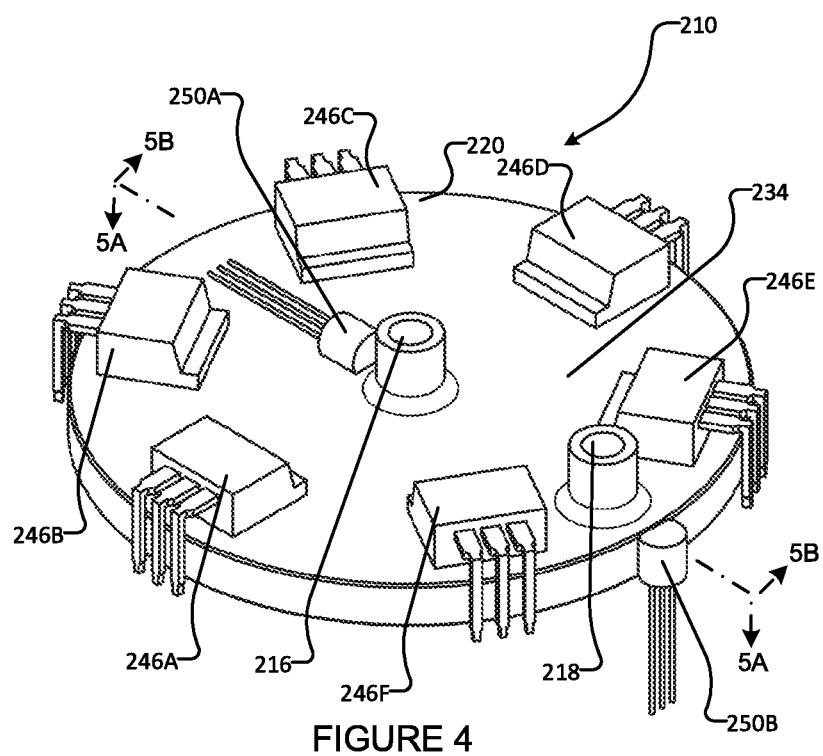
FIG. 4 is an isometric view of a flow-through heater according to a particular embodiment of the invention.

FIG. 3C is a schematic cross-sectional view of a heater 10' according to another embodiment. In many respects, heater 10' is similar to heater 10 (described above). Heater 10' differs from heater 10 primarily in that heater 10' comprises a helical-shaped wall 30' which is integrally formed with outer sleeve 20' and outer surface 32' of insert member 26' is generally cylindrically shaped, such that conduit 14' is defined by different conduit-defining surfaces. More particularly, as explained in more detail below, a central section of conduit 14' of heater 10' (i.e. potentially excluding tail sections 42, 44) is defined by outer surface 32' of insert member 26', side surfaces 34A', 34B' of helical-shaped wall 30' and inward-facing surface 38' of outer sleeve 20'.

Heater 10' comprises a conduit-defining body 12' which defines conduit 14'. Conduit 14' extends between an inlet port 16 (through which fluid enters heater 10') and an outlet port 18 (through which fluid egresses from heater 10'). In the FIG. 3C embodiment, conduit defining body 12' comprises: an outer sleeve 20' shaped to define a bore 22' which extends in a longitudinal direction 24; and an insert member 26' which also extends in longitudinal direction 24 and which is sealingly inserted into bore 22' to define conduit 14' between various surfaces of outer sleeve 20' and insert member 26'. Outer sleeve 20' and insert member 26' may be fabricated from material(s) similar to, and having properties similar to, those described above for heater 10. Heater 10' also comprises one or more heating elements 46 which may be similar to, and have properties similar to, those described above for heater 10. Heater 10' may also comprise pressure sensors 48 and temperature sensors 50 which are similar to, and have properties similar to, those of heater 10.

In the FIG. 3C, outer sleeve 20' comprises a generally helical-shaped wall 30' that extends inwardly from inward facing surface 38' of outer sleeve 20'. In the description of FIG. 3C and the accompanying claims, the words outward, outwardly, outer, inward, inwardly, inner and similar words should be understood to have the same meanings as those discussed above for heater 10 and FIGS. 1-3B. In currently preferred embodiments, outer sleeve 20' and helical-shaped wall 30' are integrally formed (i.e. from a monolithic piece of material), although this is not necessary. In some embodiments, outer sleeve 20' and helical-shaped wall 30' may be formed and joined together with a highly heat conductive joint. Wall 30' comprises side surfaces 34A', 34B' (together, side surface 34') and an inward-facing surface 36'. When insert member 26' is inserted into bore 22' of outer sleeve 20', inward-facing surface 36' of wall 30' abuts against outer surface 32' of insert member 26' to define helical-shaped conduit 14' between outer surface 32' of insert member 26', side surfaces 34' of helical-shaped wall 30' and inward-facing surface 38' of outer sleeve 20'.

In some embodiments, a central section comprising over 90% of the length of conduit 14' between inlet port 16 and outlet port 18 (e.g. potentially excluding tail sections 42, 44 near inlet port 16 and outlet port 18) is defined by outer surface 32' of insert member 26', side surfaces 34' of helical-shaped wall 30' and inward-facing surface 38' of outer sleeve 20'—e.g. substantially all of conduit 14' except for tail sections 42, 44 adjacent inlet 16 and outlet 18 respectively. In some embodiments, over 80% of the length of conduit 14' between inlet port 16 and outlet port 18 is defined by outer surface 32' of insert member 26', side surfaces 34' of helical-shaped wall 30' and inward-facing surface 38' of outer sleeve 20'.

As discussed above, insert member 26' is sealingly inserted into bore 22' of outer sleeve 20'. The fit between inward-facing surface 36' of helical shaped wall 30' and outer surface 32' of insert member 26' is designed to conduct heat well. Such a heat-conducting and sealing fit between the surfaces 32', 36' of insert member 26' and outer sleeve 20' may be similar to, and have properties similar to, the heat-conducting and sealing fit between insert member 26 and outer sleeve 20 of heater 10 described above. For example, the heat-conducting and sealing fit between the surfaces 32', 36' of insert member 26' and outer sleeve 20' may be achieved by press-fitting or crimping (which may involve deformation of one or both of insert member 26' and outer sleeve 20') and/or may involve the use of heat-conducting joint material between contact surfaces 32', 36'. Another feature that may be used to maximize (or otherwise increase in a relative sense) heat conduction between outer sleeve 20' and insert member 26' is providing sufficient contact area between contact surfaces 32', 36'.

Providing a relatively large heat conductivity (and capacity for a large amount of heat conduction) between outer sleeve 20' and insert member 26' permits both outer sleeve 20' and insert member 26' to contribute to heating the fluid in conduit 14'. Specifically, heat is conducted from heating elements 46, through outer sleeve 20', through the heat-conductive interface between outer sleeve 20' and insert member 26' to insert member 26'. Once the heat is transferred to insert member 26', the various conduit-defining surfaces of insert member 26' (e.g. outer surface 32') and outer sleeve 20' (e.g. inward facing surface 38' and side surfaces 34' of helical wall 30') may all contribute to the heating of fluid in conduit 14'. This feature contrasts with prior art heaters that provide an insert in a sleeve, but conduct heat principally from the sleeve without maximizing the heat transfer to the insert and thereby do not permit the insert to contribute significantly to the heating of the fluid. In some embodiments, all of the surfaces of the conduit-defining body that actually define the conduit may contribute significantly to heating the fluid in the conduit. In some embodiments, the various conduit-defining surfaces of insert member 26' (e.g. outer surface 32') and outer sleeve 20' (e.g. inward facing surface 38' and side surfaces 34' of helical wall 30') may contribute to heating the fluid in conduit 14' in approximately equal proportion to their conduit-defining surface areas. In some such embodiments, for at least 80% of the length of the conduit, the variation in heat flux over the conduit defining surfaces of insert member 26' (e.g. outer surface 32') and outer sleeve 20' (e.g. inward facing surface 38' and side surfaces 34' of helical wall 30') may be less than 20%. In some such embodiments, this heat flux variation is less than 10%.

Dimensional parameters a, b, c and d may be defined for heater 10' which may be similar to the dimensional parameters a, b, c and d defined in FIG. 3B for heater 10. More particularly, the parameter a may represent the longitudinal dimension of the cross-section of conduit 14', the parameter b may represent the inward/outward dimension of the cross-section of conduit 14', the parameter c may represent the longitudinal dimension of the cross-section of helical-shaped wall 30' and the parameter d may represent the longitudinal pitch of conduit 14'. With these definitions, the relationships between dimensional parameters a, b, c and d described above for heater 10 may also apply to heater 10'.

In other respects, including without limitation the control of heater 10', the selection of the thermal time constant for heater 10' and/or the like, may be substantially similar to that described herein for heater 10.

FIGS. 4, 5A, 5B and 5C provide various views of a flow-through heater 210 according to another particular embodiment. Heater 210 may be used to heat fluids—i.e. liquids and gases. In some embodiments, heater 210 may be used to heat water in beverage brewing apparatus (not shown). In some embodiments, heater 210 can be used to heat other fluids and/or for other purposes. In many respects, heater 210 is similar to heater 10 described above. Heater 210 differs from heater 10 principally in the external spiral (as opposed to helical) shape of its conduit 214 and the components used to provide this external spiral shape.

Figure 5A:
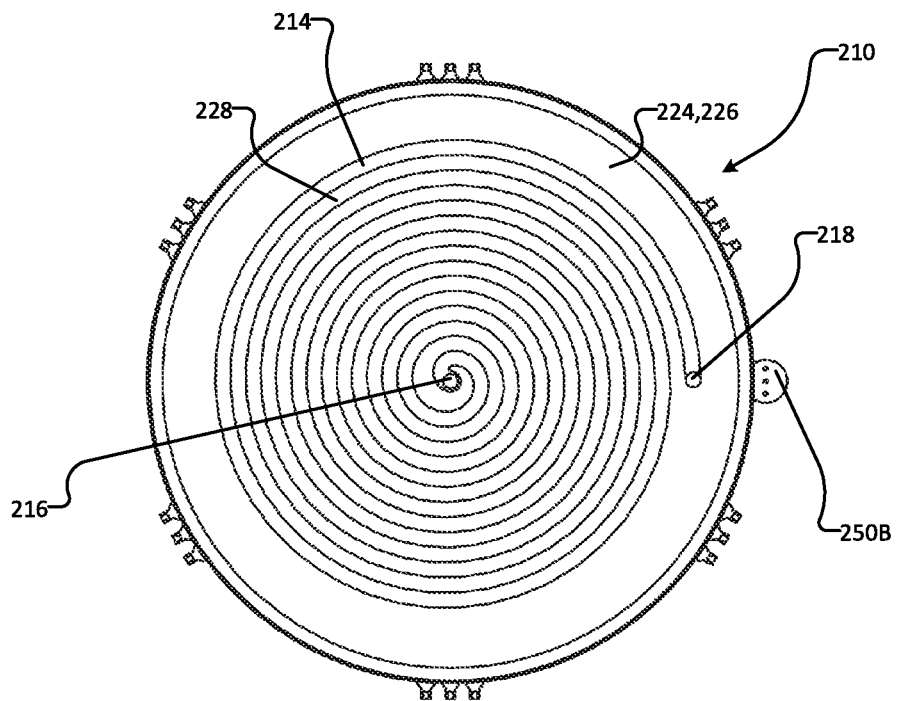
FIGS. 5A and 5B are cross-sectional views of the FIG. 4 heater taken along the lines 5A-5A and 5B-5B shown in FIG. 4.
Figure 5B:
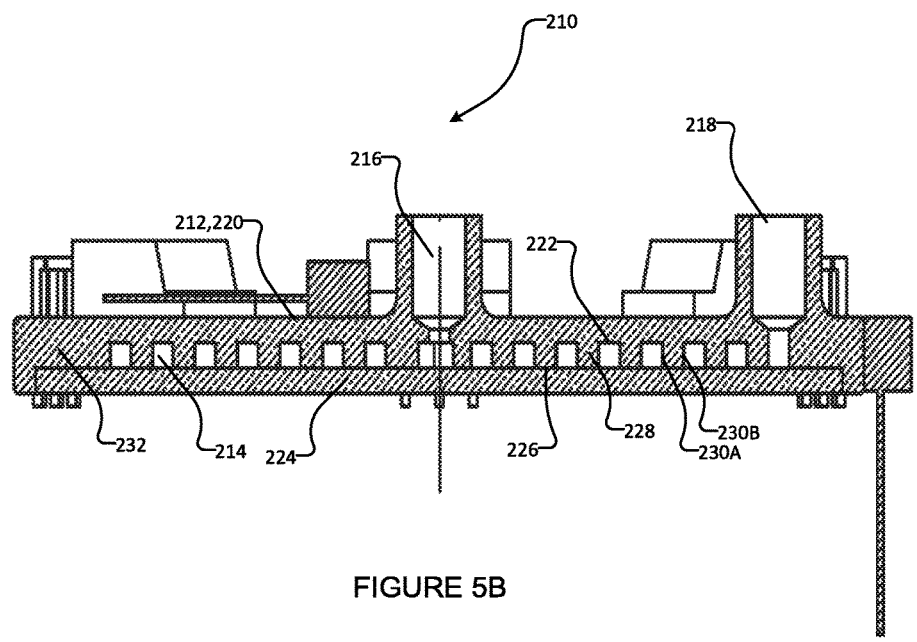
Figure 5C:
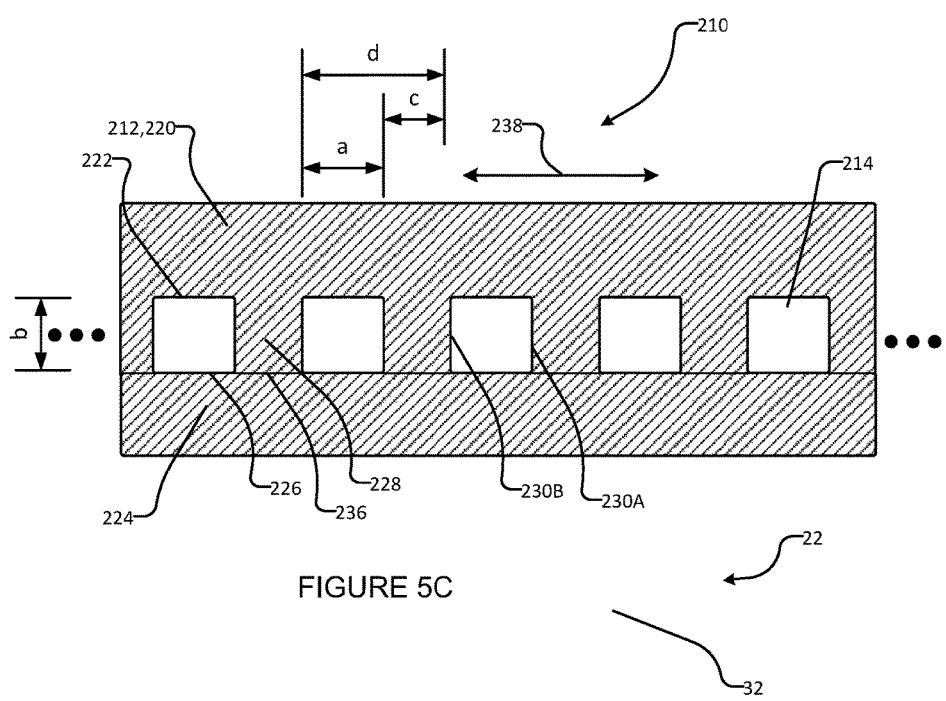
FIG. 5C is a magnified view of a portion of the FIG. 5B schematic cross-section.

Heater 210 comprises a conduit-defining body 212 which defines a conduit 214 (see FIGS. 5A-5C (collectively, FIG. 5)) that extends between an inlet port 216 and an outlet port 218. In the illustrated embodiment, conduit defining body 212 comprises: an upper member 220 comprising a generally flat, downwardly facing upper base surface 222; a lower member 224 having a generally flat, upwardly facing lower base surface 226; and a spiral-shaped wall 228 which extends in a spiral direction and abuts against upper and lower base surfaces 222, 226 to define conduit 214 between upper and lower base surfaces 222, 226 and side surfaces 230A, 230B of spiral-shaped wall 228. In some embodiments, spiral-shaped wall 228 may be integrally formed with one of upper member 220 and lower member 224. In the illustrated embodiment, spiral-shaped wall 228 is integrally formed with upper member 220. In the illustrated embodiment, upper member 220 comprises a perimeter sidewall 232 which extends downwardly and abuts against lower member 224. In some embodiments, perimeter sidewall 232 is not necessary. In some embodiments, perimeter sidewall 232 is provided on lower member 224 and extends upwardly to abut against upper member 220. In the illustrated embodiment, upper and lower members 220, 224 have generally circular shapes, but this is not necessary.

Upper member 220, lower member 224 and spiral-shaped wall 228 may be fabricated from material(s) with high thermal conductivity similar to (or the same as) the materials described above for outer sleeve 20 and insert member 26 of heater 10. Heater 210 also comprises one or more heating elements 246A-46F (collectively, heating elements 246) which may be similar to (or the same as) heating elements 46 described above for heater 10. In the illustrated embodiment, heating elements 246 are mounted to outer surface 234 of upper member 220 in a manner (e.g. soldering) which provides a highly thermally conductive contact to facilitate heat transfer from heating elements 246 to upper member 220. In other embodiments, heating elements 246 could be mounted to the outer surface of lower member 224.

In the illustrated embodiment, spiral-shaped wall 228 is integrally formed with upper member 220 and spiral-shaped wall 228 comprises side surfaces 230A, 230B which extend away from upper base surface 222 and terminate at a distal surface 236. Distal surface 236 of the illustrated embodiment abuts against lower base surface 226 (see FIG. 5C). In the illustrated embodiment, conduit 214 (e.g. over 80% or over 90% of the length of conduit 214 except for small sections near inlet 216 and outlet 218) is defined between lower base surface 226, upper base surface 222 and side surfaces 230 of spiral-shaped wall 228. In other embodiments, spiral-shaped wall 228 could be integrally formed with lower member 224, such that its distal surface abutted against upper base surface 222. In still other embodiments, spiral-shaped wall 228 could be separate from, and could abut against, both upper and lower members 220, 224. In such other embodiments, conduit 214 (e.g. over 80% or over 90% of the length of conduit 214 except for small sections near inlet 216 and outlet 218) would still be defined between lower base surface 226, upper base surface 222 and side surfaces 230 of spiral-shaped wall 228.

Abutment joints between spiral-shaped wall 228 and lower base surface 226 and/or upper base surface 222 (e.g. in the illustrated embodiment, the abutment joint between distal surface 236 of spiral wall 228 and lower base surface 226) is designed to conduct heat well. Such heat conducting abutment joints may be achieved by press-fitting spiral wall 228 between upper and lower members 220, 224 and/or crimping upper and lower members 220, 224 together with spiral wall 228 in between. In some embodiments, a gap-filling, heat-conducting solder and/or similar heat-conducting joint material 239 may be used between contact surfaces of the abutments joints (e.g. between distal surface 236 of spiral wall 228 and lower base surface 226). Press-fitting and/or the use of heat-conducting joint material may minimize microscopic air bubbles between the abutment joints thereby maximize (or otherwise increase in a relative sense) heat conduction between upper member 220, lower member 224 and spiral wall 228. Another feature that may be used to maximize (or otherwise increase in a relative sense) heat conduction between upper member 220, lower member 224 and spiral wall 228 is providing sufficient contact area between the abutment joints. This contact area may be related to the parameters a, c and d discussed in more detail below.

Providing a relatively large heat conductivity (and capacity for a large amount of heat conduction) between upper member 220, lower member 224 and spiral wall 228 permits all of upper member 220, lower member 224 and spiral wall 228 to contribute to heating the fluid in conduit 214. Specifically, heat is conducted from heating elements 246, through upper member 220, through spiral wall 228 (and any heat conductive abutment joints) to lower member 224. In this manner, all of the conduit-defining surfaces (e.g. lower base surface 226, upper base surface 222 and side surfaces 230 of spiral-shaped wall 228) may contribute significantly to the heating of fluid in conduit 214. In some embodiments, the various conduit-defining surfaces (e.g. lower base surface 226, upper base surface 222 and side surfaces 230 of spiral-shaped wall 228) may contribute to heating the fluid in conduit 214 in approximately equal proportion to their conduit-defining surface areas. In some such embodiments, for at least 80% of the length of the conduit, the variation in heat flux over the conduit defining surfaces (e.g. lower base surface 226, upper base surface 222 and side surfaces 230 of spiral-shaped wall 228) may be less than 20%. In some such embodiments, this heat flux variation is less than 10%.

In the illustrated embodiment, as shown best in FIG. 5C, conduit 214 has a generally rectangular cross-section (e.g. with slightly rounded corners) having dimensions a (in radial direction 238) and b (in the upward/downward direction). This is not necessary. In some embodiments, bore 214 may be defined with different cross-sectional shapes. In the illustrated embodiment, spiral-shaped wall 228 has a generally rectangular cross-section (e.g. with slightly rounded corners) having dimensions b (in the upward/downward direction) and c (in radial direction 238). This is not necessary. In some embodiments, spiral wall 228 may be provided with different cross-sectional shapes. In the case of the illustrated embodiment, the pitch of spiral-shaped wall 228 (and the corresponding pitch of conduit 14) along radial direction 238 is given by d=a+c.

The experiments shown in FIG. 7 and described above demonstrate the desirability (although not the necessity) of fabricating heater 210 with desirable relative dimensional characteristics. Provided that there is high thermal conductivity contact between upper member 220, spiral wall 228 and lower member 224, such relative dimensions may minimize regions of the conduit-defining surface(s) (e.g. lower base surface 226, upper base surface 222 and side surfaces 230 of spiral-shaped wall 228) having high heat flux and may minimize heat flux variation over the conduit-defining surface(s). In some embodiments, the conduit defining surfaces are dimensioned such that $0.3 \le a/b \le 3$. In some embodiments, the conduit defining surfaces are dimensioned such that $0.8 \le a/b \le 1.2$. In some embodiments, the conduit-defining surfaces are dimensioned such that $0.3 \le c/a \le 3$. In some embodiments, the conduit-defining surfaces are dimensioned such that $0.8 \le c/a \le 1.2$. In some embodiments, the conduit-defining surfaces are dimensioned such that $0.8 \le c/b \le 1.2$. In some embodiments, it is desirable that $a \approx b \approx c$—e.g. the dimensions a, b and c may be within 20% of one another.

Provided that there is high thermal conductivity contact between upper member 220, lower member 224 and spiral wall 228, such relative dimensions may minimize regions of the conduit-defining surface(s) having high heat flux and may minimize heat flux variation over the conduit-defining surface(s). In some embodiments, the various conduit-defining surfaces (e.g. lower base surface 226, upper base surface 222 and side surfaces 230 of spiral-shaped wall 228) may contribute to heating the fluid in conduit 214 in approximately equal proportion to their conduit-defining surface areas. In some such embodiments, for at least 80% of the length of the conduit, the variation in heat flux over the conduit defining surfaces (e.g. lower base surface 226, upper base surface 222 and side surfaces 230 of spiral-shaped wall 228) may be less than 20%. In some such embodiments, this heat flux variation is less than 10%.

In the illustrated embodiment, heater 210 comprises an optional inlet temperature sensor 250A near inlet port 216 and an optional outlet temperature sensor 250B near outlet port 218. Heater 210 may also optionally comprise inlet and outlet pressure sensors (not shown). These temperature and/or pressure sensors may be used by suitably configured analog or digital controllers and control systems similar to those described above for heater 10. Such controllers and control systems may control the heat generated by heating elements 246, the rate of flow of fluid through heater 210 or both and may thereby control the heat imparted on (and/or the temperature of) the fluid flowing through conduit 214.

In particular embodiments, heater 210 is designed for use with a particular fluid and the thermal time constant $R_{th}C_{th(body)}$ of the conduit-defining body 212 is selected to be at least approximately equal (e.g. within 10%) to the thermal time constant $R_{th}C_{th(fluid)}$ of the fluid for which heater 210 is intended to be used (based on the assumption that the volume of conduit 214 is filled with fluid). In some embodiments, the thermal time constant $R_{th}C_{th(body)}$ of conduit-defining body 212 is selected to be equal to the thermal time constant of water (based on the assumption that the volume of conduit 214 is filled with water). As discussed above, this selection of thermal time constants may help to facilitate desirable temperature control—e.g. contributing to a relatively rapid thermal response that is controllably stable. It will be appreciated that for a given fluid, the relative volume of conduit-defining body 212 and/or conduit 214 may be adjusted to provide the at least approximate equality between $R_{th}C_{th(body)}$ and $R_{th}C_{th(fluid)}$. Additionally or alternatively, for a given fluid, the material from which conduit-defining body 212 is fabricated may be adjusted to provide the at least approximate equality between $R_{th}C_{th(body)}$ and $R_{th}C_{th(fluid)}$.

In other respects, heater 210 and its characteristics may be substantially similar to those described herein for heater 10.

Figures 8A, 8B:
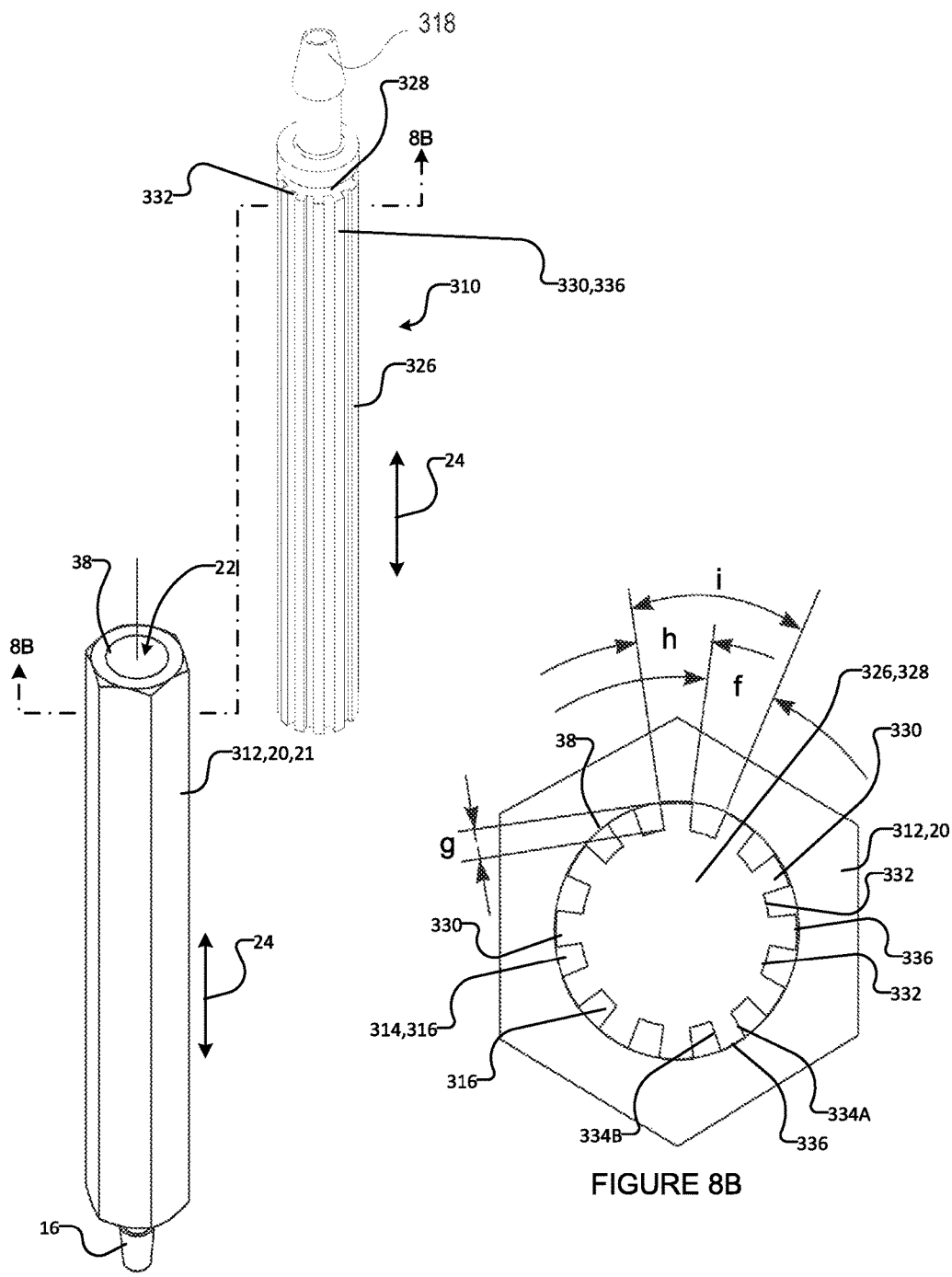
FIG. 8A is an exploded isometric view of a heater according to another particular embodiment.
FIG. 8B is a schematic cross-sectional view of the FIG. 8A heater taken along the line 8B-8B shown in FIG. 8A.

FIGS. 8A and 8B provide various views of a flow-through heater 310 according to a particular embodiment. Heater 310 is similar in many respects to heater 10 described herein. Heater 310 comprises a conduit-defining body 312 which defines a conduit 314 that extends between an inlet port 16 (through which fluid enters heater 310) and an outlet port 318 (through which fluid egresses from heater 310). Heater 310 differs from heater 10 described herein in that conduit-defining body 312 of heater 310 is shaped to provide conduit 314 with a number of parallel sub-conduits 316 which extend in longitudinal direction 24 between inlet port 16 and outlet port 318. In the illustrated embodiment, conduit defining body 312 comprises: an outer sleeve 20 (substantially similar to outer sleeve 20 of heater 10—i.e. comprising a bore defining surface 38 shaped to define a bore 22 which extends in a longitudinal direction 24); and an insert member 326 which also extends in longitudinal direction 24 and which is sealingly inserted into bore 22 to define conduit 314 between various surfaces of outer sleeve 20 and insert member 326. As mentioned, sleeve 20 of heater 310 may be substantially similar to sleeve 20 of heater 10 described herein. Outer sleeve 20 and insert member 326 may be fabricated from material(s) similar to, and having properties similar to, those discussed above for heater 10. Heater 310 may also comprise heating elements (not shown), temperature sensors (not shown) and pressure sensors (not shown) which may be similar to those of heater 10, but these are omitted from FIGS. 8A and 8B for clarity.

In the illustrated embodiment of FIGS. 8A and 8B, insert member 326 comprises a central longitudinally extending core 328 and a plurality splines 330 that extend in longitudinal direction 24 and outwardly away from an outer surface 332 of core 328. In the description of FIGS. 8A and 8B and the accompanying claims, the words outward, outwardly, outer, inward, inwardly, inner and similar words should be understood to have the same meanings as those discussed above for heater 10 and FIGS. 1-3B. In currently preferred embodiments, core 328 and splines 330 are integrally formed (i.e. from a monolithic piece of material), although this is not necessary. In some embodiments, core 328 and splines 330 may be formed and joined together with a highly heat conductive joint. Splines 330 comprises side surfaces 334A, 334B (together, side surface 334) and an outer surface 336. When insert member 326 is inserted into bore 22 of outer sleeve 20, outer surfaces 336 of splines 330 abut against bore defining surface 38 of outer sleeve 20 to define conduit 314 and sub-conduits 316 between bore-defining surface 38, outer surface 332 of core 328 and side surfaces 334 of splines 330.

In some embodiments, over 90% of the length of each sub-conduit 316 between inlet port 16 and outlet port 318 is defined by bore-defining surface 38, outer surface 332 of core 328 and side surfaces 334 of splines 330—e.g. substantially all of each sub-conduit 316 except for tail sections (not shown) adjacent inlet 16 and outlet 318. In some embodiments, over 80% of the length of each sub-conduit between inlet port 16 and outlet port 318 is defined by bore-defining surface 38, outer surface 332 of core 328 and side surfaces 334 of splines 330.

Insert member 326 is sealingly inserted into bore 22 of outer sleeve 20. The fit between bore-defining surface 38 and outer surfaces 336 of splines 330 is designed to conduct heat well. Such a heat-conducting and sealing fit between insert member 326 and outer sleeve 20 may be achieved using techniques similar to those discussed above for heater 10—i.e. press-fitting and/or crimping (which may involve deformation of one or both of insert member 326 and outer sleeve 20) and/or by using heat-conducting joint material between contact surfaces of insert member 326 and outer sleeve 20 (e.g. between bore-defining surface 38 and outer surfaces 336 of splines 330). Another feature that may be used to maximize (or otherwise increase in a relative sense) heat conduction between outer sleeve 20 and insert member 326 is providing sufficient contact area between bore-defining surface 38 and outer surfaces 336 of splines 330.

Providing a relatively large heat conductivity (and capacity for a large amount of heat conduction) between outer sleeve 20 and insert member 326 permits both outer sleeve 20 and insert member 326 to contribute to heating the fluid in conduit 314. Specifically, heat is conducted from heating elements (located on an exterior of outer sleeve 20), through outer sleeve 20, through the heat-conductive interface between outer sleeve 20 and insert member 326 to insert member 326. Once the heat is transferred to insert member 326, the various conduit-defining surfaces of insert member 326 (e.g. outer surface 332 of core 328 and side surfaces 334 of splines 330) and outer sleeve 20 (e.g. bore-defining surface 38) may all contribute to the heating of fluid in conduit 314. This feature contrasts with prior art heaters that provide an insert in a sleeve, but conduct heat principally from the sleeve without maximizing the heat transfer to the insert and thereby do not permit the insert to contribute significantly to the heating of the fluid. In some embodiments, all of the surfaces of the conduit-defining body that actually define the conduit 314 (and each sub-conduit 316) may contribute significantly to heating the fluid in the conduit. In some embodiments, the various conduit-defining surfaces of insert member 326 (e.g. outer surface 332 of core 328 and side surfaces 334 of splines 330) and outer sleeve 20 (e.g. bore-defining surface 38) may contribute to heating the fluid in approximately equal proportion to their conduit-defining surface areas. In some embodiments, for at least 80% of the length of each sub-conduit, the variation in heat flux over the conduit defining surfaces of insert member 326 (e.g. outer surface 332 of core 328 and side surfaces 334 of splines 330) and outer sleeve 20 (e.g. bore-defining surface 38) may be less than 20%. In some such embodiments, this heat flux variation is less than 10%.

Dimensional parameters f, g, h and i may be defined for heater 310 as shown in FIG. 8B. More particularly: the parameter f may represent the arc-length of sub-conduit 316 (at an outer radial edge of sub-conduit 316 at the interface of insert member 326 and sleeve 20); the parameter g may represent the inward/outward (radial) dimension of each sub-conduit 316 the parameter h may represent an arc-length of spline 330 (at an outer radial edge of spline 330 at the interface of insert member 326 and sleeve 20); and the parameter i may represent the arc-length pitch of sub-conduits 316 (at an outer radial edge of sub-conduits 316 at the interface of insert member 326 and sleeve 20).

Figure 9A:
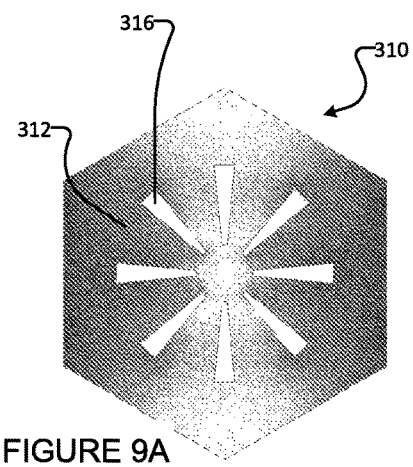
FIGS. 9A, 9B, 9C show heat-flux model results for a portion of the FIG. 8A, 8B heater having various relative sub-conduit dimensions.
Figure 9B:
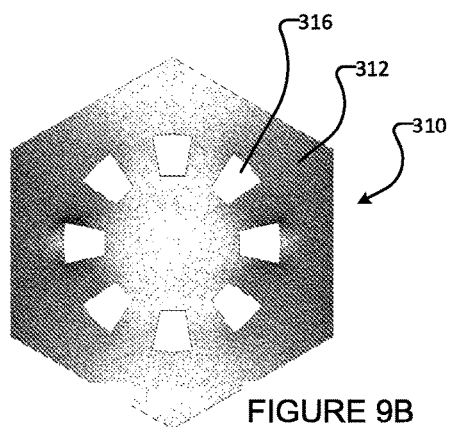
Figure 9C:
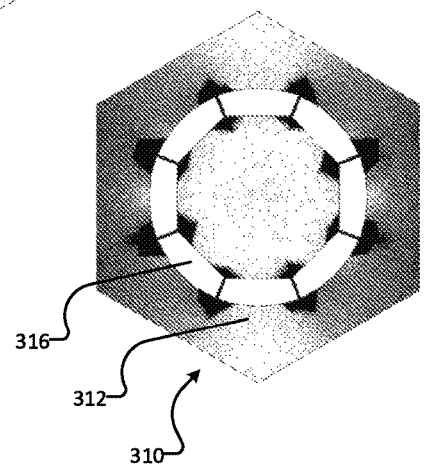

FIGS. 9A, 9B, 9C (collectively, FIG. 9) show experimental heat-flux model results for the FIG. 8A, 8B heater 310 having various relative sub-conduit dimensions. FIG. 9 is similar to FIG. 7 in that the white regions in FIG. 9 represent conduit 314 (and sub-conduits 316) and the heat flux (in $10^6$ W/m$^2$) is shown in grey-scale with darker regions showing more flux density and lighter regions showing less flux density. The FIG. 9 simulations were conducted under the same conditions as those of FIG. 7, with the heating elements positioned as shown in FIG. 1 and with the FIG. 9 cross-sections taken halfway between the inlet and outlet.

The model simulations of each of FIGS. 9A, 9B, 9C were conducted with different relative conduit dimensions f, g, h. Specifically (referring to FIG. 8B), FIG. 9A shows a model simulation where f=0.5x, g=2x, h=1.5x; FIG. 9B shows a model simulation where f=x, g=x, h=x; and FIG. 9C shows a model simulation where f=2x, g=0.5x, h=0.1x. In the particular non-limiting case of the illustrated simulation x=1.6 mm.

Comparing FIG. 9A, 9B and 9C it can be seen that where the splines are relatively wide (dimension h) in comparison to the width of the sub-conduits 316 (dimension f), the heat flux into sub-conduits 316 is relatively even for all surfaces of sub-conduit 316 (at least at surfaces away from the inlet and outlet edges of heater 310) and the peak heat flux is relatively low. In particular, the heat gradients into sub-conduits 316 are relatively low in FIG. 9A, where the dimension h is relatively large in comparison to the dimension f This is because the amount of surface area of the outward surfaces 336 of splines 330 in contact with bore defining surface 38 is sufficiently large when the dimensions h is relatively large and thereby permits sufficient heat flow into core 328 insert member 326. The FIG. 9A case contrasts with the situation where the dimension h is lower than the dimension f (FIG. 9C) which exhibits unacceptably high peak flux and unacceptably high flux variation. The median case (FIG. 9B) shows some heat flux variation and some regions of high heat flux, but this amount of heat flux variation and high heat flux may be acceptable. The drawbacks of high heat flux and heat flux variation are discussed above.

The FIG. 9 experiments demonstrate the desirability (although not the necessity) of fabricating heater 310 with desirable relative dimensional characteristics. Provided that there is high thermal conductivity contact between sleeve 20 and insert member 326, such relative dimensions may minimize regions of the conduit-defining surface(s) (e.g. outer surface 332 of core 328, side surfaces 334 of splines 330 and bore-defining surface 38 of sleeve 20) having high heat flux and may minimize heat flux variation over the conduit-defining surface(s). In some embodiments, the conduit defining surfaces are dimensioned such that $0.5 \leq h/f \leq 3$. In some embodiments, the conduit-defining surfaces are dimensioned such that $0.2 \leq f/g \leq 2$. In some embodiments, the conduit-defining surfaces are dimensioned such that $0.2 \leq h/g \leq 1$. Provided that there is high thermal conductivity contact between sleeve 20 and insert member 326, such relative dimensions may minimize regions of the conduit-defining surface(s) having high heat flux and may minimize heat flux variation over the conduit-defining surface(s).

In other respects, including without limitation the control of heater 310, the selection of the thermal time constant for heater 310 and/or the like, may be substantially similar to that described herein for heater 10.

It will be appreciated by those skilled in the art that in some embodiments and in a manner analogous to heaters 10 and 10' described above, splines could be provided on an interior of the outer sleeve and the insert member could be made cylindrical and dimensioned such that the outer surface of the insert member abutted in heat-conducting contact with the inward-facing surfaces of the splines. In such embodiments, the sub-conduits would be defined by the inward facing surfaces of the outer sleeve, the outward facing surface of the insert member and the side surfaces of the splines. In other respects, such embodiments would be similar to heater 310 described herein.

While a number of exemplary aspects and embodiments are discussed herein, those of skill in the art will recognize certain modifications, permutations, additions and sub-combinations thereof. For example:

In the illustrated embodiments of FIGS. 1-3B, 3C and 8A, 8B, the bore defined in the outer sleeve is circular in cross-section. This is not necessary. In other embodiments, the cross-section of this bore may have other shapes, in which case the outer shape of the helical wall and or the cross-section of the insert member may also be other than circular.

Heating elements 46, 246 of the illustrated embodiments are located outside of the fluid-conducting conduits. This is not necessary. In some embodiments, heating elements 46, 246 may be located inside conduits.

The particular embodiments described herein include a helical-shaped conduit, a spiral-shaped conduit and a conduit comprising parallel sub-conduits defined by splines. In some embodiments, a conduit comprising curved sections having other shapes (e.g. meandering) could be provided.

In some embodiments, one or more of heating elements 46, 246 comprises a heat-dissipating electric or electronic component whose primary function is something other than heating (e.g. a voltage regulator, which may provide part of the control system for its heater and/or the like). The thermal power of such heat-dissipating components may be harnessed to add to heating the fluid in the heater rather than its natural heat dissipation being wasted to the surrounding environment.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A flow-through heater for heating a fluid, the flow-through heater comprising:
    a high thermal conductivity conduit-defining body shaped to provide, within the conduit-defining body, a conduit that extends between an inlet port and an outlet port;
    one or more heating elements connected in physical contact to the conduit-defining body by corresponding heat-conducting contact connections for providing heat to the conduit-defining body by contact-based heat conduction, thereby permitting the conduit defining-body to provide heat to fluid flowing through the conduit by heat conduction through the conduit-defining body and into the fluid;
    a temperature sensor connected in direct thermal contact, or in indirect thermal contact through the high thermal conductivity conduit-defining body, to the fluid to sense a measured temperature indicative of a temperature of the fluid in a vicinity of the temperature sensor;
    one or more flow rate sensors for sensing a measured flow rate of the fluid through the conduit; and
    a controller connected to receive a temperature sensor signal generated by the temperature sensor and a flow rate signal generated by the one or more flow rate sensors, the controller configured to control an amount of heat energy imparted to the fluid during a period that the fluid is resident in the conduit between the inlet port and the outlet port based at least in part on the measured temperature and the measured flow rate.

2. A heater according to claim 1 wherein the controller is configured to control the amount of heat energy imparted to the fluid during the period by controlling a heat output rate of the one or more heating elements.

3. A heater according to claim 2 wherein the controller is configured to control the heat output rate of the one or more heating elements based at least in part on a comparison of the measured temperature to a desired output temperature.

4. A heater according to claim 2 comprising at least one of:
    a pump controllably connected to the controller and connected to provide the fluid to the inlet of the conduit, wherein the controller is configured, by sending flow rate control signals to the pump, to maintain the flow rate of the fluid through the conduit constant and, by sending heat output rate control signals to the one or more heating elements, to cause the measured temperature to track a desired output temperature; and
    a throttle valve controllably connected to the controller and connected to provide the fluid to the inlet of the conduit, wherein the controller is configured, by sending flow rate control signals to the throttle valve, to maintain the flow rate of the fluid through the conduit constant and, by sending heat output rate control signals to the one or more heating elements, to cause the measured temperature to track a desired output temperature.

5. A heater according to claim 1 wherein the controller is configured to control the amount of heat energy imparted to the fluid during the period by controlling the flow rate of the fluid through the conduit.

6. A heater according to claim 5 comprising at least one of:
    a pump controllably connected to the controller and connected to provide the fluid to the inlet of the conduit, wherein the controller is configured to control the flow rate of the fluid though the conduit by sending flow rate control signals to the pump; and
    a throttle valve controllably connected to the controller and connected to provide the fluid to the inlet of the conduit, wherein the controller is configured to control the flow rate of the fluid through the conduit by sending flow rate control signals to the throttle valve.

7. A heater according to claim 5 wherein the controller is configured to control the flow rate of the fluid through the conduit based at least in part on a comparison of the measured temperature to a desired output temperature.

8. A heater according to claim 5 wherein the controller is configured to control the flow rate of the fluid through the conduit based at least in part on the measured flow rate of the fluid through the conduit.

9. A heater according to claim 8 wherein the controller is configured to control the flow rate of the fluid through the conduit to cause the measured temperature to track a desired output temperature.

10. A heater according to claim 6 wherein the controller is configured to:
    maintain a heat output rate of the one or more heating elements constant;
    control the flow rate of the fluid through the conduit, based at least in part on the measured flow rate of the fluid through the conduit; and
    control the flow rate of the fluid through the conduit to cause the measured temperature to track a desired output temperature.

11. A heater according to claim 2 wherein the controller is configured to control the amount of heat energy imparted to the fluid during the period by controlling the flow rate of the fluid through the conduit.

12. A heater according to claim 1 wherein the temperature sensor comprises a first temperature sensor connected to sense a first measured temperature indicative of a temperature of the fluid in a vicinity of the inlet port and a second temperature sensor connected to sense a second measured temperature indicative of a temperature of the fluid in a vicinity of the outlet port and wherein the controller is connected to receive first and second temperature sensor signals generated by the first and second temperature sensors, the controller configured to control the amount of heat energy imparted to the fluid during the period that the fluid is resident in the conduit between the inlet port and the outlet port based at least in part on the first and second measured temperatures.

13. A heater according to claim 12 wherein the controller is configured to control the amount of heat energy imparted to the fluid during the period by controlling a heat output rate of the one or more heating elements.

14. A heater according to claim 13 wherein the controller is configured to control the heat output rate of the one or more heating elements to cause the second measured temperature to track a desired output temperature.

15. A heater according to claim 12 wherein the controller is configured to control the amount of heat energy imparted to the fluid during the period by controlling the flow rate of the fluid through the conduit.

16. A heater according to claim 15 wherein the controller is configured to control the flow rate of the fluid through the conduit to cause the second measured temperature to track a desired output temperature.

17. A heater according to claim 1 wherein the conduit comprises a central section comprising over 80% of the length of the conduit at locations away from the inlet port and the outlet port and wherein the conduit-defining body is shaped such that for any given cross-section of the conduit in the central section, heat flows evenly from the one or more heating elements into the conduit with a heat flux variation of less than 20% over a perimeter of the cross-section.

18. A heater according to claim 1 wherein the heater is designed to be used with a particular liquid fluid, the conduit-defining body is fabricated from a particular material and a combination of the particular liquid fluid and the particular material have a known watt density that will cause nucleate boiling of the liquid fluid; wherein the one or more heating elements are controlled to output a maximum heat power; and wherein the conduit-defining body is shaped to provide the conduit with a surface area greater than a quotient of the maximum output heat power divided by the known watt density, to thereby avoid nucleate boiling.

19. A heater according to claim 1 wherein a heat output of the one or more heating elements is maintained below a level at which the fluid experiences nucleate boiling.

20. A heater according to claim 3 wherein the flow rate of the fluid through the conduit is permitted to vary without control from the controller.

21. A heater according to claim 1 wherein the controller is configured, by sending heat output rate control signals to the one or more heating elements, to cause the measured temperature to track a desired output temperature.

22. A heater according to claim 1 wherein the high thermal conductivity conduit-defining body has a thermal conductivity greater than 100 W/mK.

23. A heater according to claim 1 wherein the high thermal conductivity conduit-defining body has a thermal conductivity greater than 200 times the thermal conductivity of the fluid.

24. A heater according to claim 1 wherein the controller is configured to control the amount of heat energy imparted to the fluid to heat the fluid to a desired temperature at the outlet port while accommodating fluctuations in the temperature of the fluid at the inlet port as the fluid flows from the inlet port to the outlet port in a time that is as short as possible, while avoiding nucleate boiling.

25. A method for heating a fluid in a flow-through heater, the method comprising:
   providing a high thermal conductivity conduit-defining body shaped to provide, within the conduit-defining body, a conduit that extends between an inlet port and an outlet port;
   heating the conduit-defining body using one or more heating elements connected in physical contact to the conduit-defining body by corresponding heat-conducting contact connections for providing heat to the conduit-defining body by contact-based heat conduction, thereby permitting the conduit defining-body to provide heat to any fluid flowing through the conduit by heat conduction through the conduit-defining body and into the fluid;
   sensing a measured temperature indicative of a temperature of the fluid;
   sensing a measured flow rate of the fluid through the conduit; and
   controlling, by a controller, an amount of heat energy imparted to the fluid during a period that the fluid is resident in the conduit between the inlet port and the outlet port based at least in part on the measured temperature and the measured flow rate;
   wherein sensing the measured temperature indicative of a temperature of the fluid comprises:
      providing a temperature sensor in direct thermal contact, or in indirect thermal contact through the high thermal conductivity conduit-defining body, to the fluid; and
      receiving, at the controller, a signal corresponding to the measured temperature.

* * * * *